(12) United States Patent
Kim

(10) Patent No.: US 12,545,962 B2
(45) Date of Patent: Feb. 10, 2026

(54) BIOMARKER FOR PREDICTING THE PROGNOSIS OF COLORECTAL CANCER

(71) Applicant: GIL MEDICAL CENTER, Incheon (KR)

(72) Inventor: Jung Ho Kim, Incheon (KR)

(73) Assignee: GIL MEDICAL CENTER, Incheon (KR)

( * ) Notice: Subject to any disclaimer, the term of this patent is extended or adjusted under 35 U.S.C. 154(b) by 0 days.

(21) Appl. No.: 18/727,602

(22) PCT Filed: Jan. 4, 2023

(86) PCT No.: PCT/KR2023/000138
§ 371 (c)(1),
(2) Date: Feb. 7, 2025

(87) PCT Pub. No.: WO2023/132618
PCT Pub. Date: Jul. 13, 2023

(65) Prior Publication Data
US 2025/0171853 A1  May 29, 2025

(30) Foreign Application Priority Data
Jan. 10, 2022 (KR) .................. 10-2022-0003108

(51) Int. Cl.
| | | |
|---|---|---|
| G01N 31/00 | (2006.01) | |
| C12Q 1/6886 | (2018.01) | |
| G01N 33/53 | (2006.01) | |
| G01N 33/574 | (2006.01) | |

(52) U.S. Cl.
CPC ..... *C12Q 1/6886* (2013.01); *G01N 33/57419* (2013.01); *C12Q 2600/118* (2013.01); *C12Q 2600/158* (2013.01); *G01N 2333/90209* (2013.01)

(58) Field of Classification Search
None
See application file for complete search history.

(56) References Cited

U.S. PATENT DOCUMENTS

2007/0224648 A1* 9/2007 Cox .................. G01N 33/74
435/254.2
2012/0039811 A1  2/2012 Admon et al.

FOREIGN PATENT DOCUMENTS

| CN | 111139300 | 5/2020 | |
|---|---|---|---|
| WO | WO 2014/015118 | 1/2014 | |
| WO | WO-2014015118 A1 * | 1/2014 | .......... C12Q 1/6886 |
| WO | WO 2015/006262 | 1/2015 | |
| WO | WO 2010/042228 A2 | 4/2020 | |

OTHER PUBLICATIONS

Jiao, H. L. et al. Cell Death and Disease. 2020, vol. 11, No. 7, inner pp. 1-13 (online publication: Jul. 24, 2020)(Year: 2020).*
Hao et al. (Oct. 2021) "Clinical Value and Potential Mechanisms of Oxysterol-Binding Protein Like 3 (OSBPL3) in Human Tumors," Frontiers in Molecular Biosciences, vol. 8, thesis No. 739978, p. 1-21.
Jiao et al. (2020) "Upregulation of OSBPL3 by HIF1A promotes colorectal cancer progression through activation of RAS signaling pathway," Cell Death and Disease, vol. 11, No. 7, p. 1-13.
International Search Report and Written Opinion for International Application No. PCT/KR2023/000138, mailed Apr. 4, 2023, 7 pages.
Li et al. (2018) "Nicotinamide nucleotide transhydrogenase-mediated redox homeostasis promotes tumor growth and metastasis in gastric cancer," Redox Biology, 18, 246-255.
Pei et al. (Apr. 2021) "A Novel TNM Classification for Colorectal Cancers based on the Metro-ticket Paradigm," Journal of Cancer, vol. 12, No. 11, p. 3299-3306.
Zhang et al. (Jul. 2021) "Identification of hub genes in colorectal cancer based on weighted gene co-expression network analysis and clinical data from The Cancer Genome Atlas," Bioscience Reports, vol. 41, No. 7, thesis No. BSR20211280, p. 1-14.
Li et al. (Sep. 1, 2018) "Nicotinamide nucleotide transhydrogenase-mediated redox homeostasis promotes tumor growth and metastasis in gastric cancer," Redox Biology, vol. 18, pp. 246-255.

* cited by examiner

*Primary Examiner* — Lisa V Cook
(74) *Attorney, Agent, or Firm* — LEYDIG, VOIT & MAYER, LTD.

(57) ABSTRACT

The present invention relates to a biomarker for predicting the prognosis of colorectal cancer by using changes in expression level of NNT and/or OSBPL3, and a prognosis prediction method using same. The expression level of NNT and/or OSBPL3 is analyzed so that the prognosis of colorectal cancer patients in clinical practice can be predicted, and if the analysis is performed in combination with TNM stage, more accurate prediction can be made such that individualized and customized strategies can be designed.

3 Claims, 28 Drawing Sheets

FIG. 14

| KEGG pathway | OW NNT$_{Low}^{a}$ GSEA* normalized enrichment score | OW NNT$_{High}^{b}$ GSEA* normalized enrichment score | Metabolic sub-pathways |
|---|---|---|---|
| Base excision repair | 1.67 | | |
| Nicotinate and nicotinamide metabolism | -1.67 | | |
| Inositol phosphate metabolism | -1.59 | | |
| Purine metabolism | -1.48 | | |
| Renin-angiotensin system | -1.48 | | |
| Prion disease | | -1.47 | |
| Glycosphingolipid biosynthesis - ganglio series | | -1.43 | |
| Valine, leucine and isoleucine degradation | -1.65 | -1.66 | |
| Starch and sucrose metabolism | -1.62 | -1.59 | |
| Mucin type O-glycan biosynthesis | -1.60 | -1.45 | |
| Tyrosine metabolism | -1.58 | -1.49 | |
| Glycolysis / Gluconeogenesis | -1.53 | -1.49 | |
| Drug metabolism - other enzymes | -1.51 | -1.46 | |
| Glycerophospholipid metabolism | -1.46 | -1.42 | |

BIOMARKER FOR PREDICTING THE PROGNOSIS OF COLORECTAL CANCER

CROSS-REFERENCE TO RELATED APPLICATIONS

This application is a U.S. National Stage Application filed under 35 U.S.C. § 371 of International Application No. PCT/KR2023/000138, filed Jan. 4, 2023, and claims the benefit of priority from Korean Patent Application No. 10-2022-0003108, filed on Jan. 10, 2022, the contents of which are incorporated herein by reference.

BACKGROUND OF THE INVENTION

1. Field of the Invention

The present invention relates to a biomarker for predicting the prognosis of colorectal cancer

2. Description of the Related Art

The digestive system is divided into the esophagus, stomach, small intestine, and large intestine, and the large intestine is the last part of the digestive system, where primarily moisture and electrolyte absorption occur. The large intestine is divided into colon, cecum, and rectum, and the colon is further divided into ascending colon, transverse colon, descending colon, and sigmoid colon. Depending on the location of cancer, cancer that occurs in the colon is called colon cancer, and cancer that occurs in the rectum is called rectal cancer, which are collectively called colorectal cancer. The approximate incidence of cancer in each region of the large intestine is known to be 25% in the cecum and ascending colon, 15% in the transverse colon, 5% in the descending colon, 25% in the sigmoid colon, 10% in the rectum-sigmoid colon junction, and 20% in the rectum.

The large intestine is a pipe-shaped tube and is divided into four layers from the inside: the mucosal, submucosal, muscular, and serosal layers. Most colorectal cancers are adenocarcinomas that originate in the mucous membrane of the colon, but others include lymphomas, sarcomas, squamous cell carcinomas, and metastatic lesions from other cancers.

The causes of these colorectal cancers can be largely divided into environmental and genetic factors. Although the cause of colorectal cancer is still unclear, it is believed that environmental factors play a greater role in the development of colorectal cancer than genetic factors, and it is recognized that rapid westernization of diet, especially excessive consumption of animal fats and proteins, is a contributing factor. However, around 5% of colorectal cancers are thought to be caused by a genetic predisposition.

The relationship between diet and colorectal cancer is one of the most studied areas of research, and changes in where people live, such as through immigration, can change the incidence of colorectal cancer based on regional characteristics, regardless of genetic differences. In particular, high calorie intake, excessive consumption of animal fats, high-fat diet, obesity, low fiber intake, weight gain, inflammatory bowel disease, and colorectal polyps are known to increase the risk of colorectal cancer.

Obese people have more than 10 times the risk of colorectal cancer than people of normal weight, as well as a worse prognosis after surgery. Obesity plays a role in the development of most cancers, not just colorectal cancer, so managing obesity is essential for cancer prevention. However, the mechanism by which obesity causes cancer has not yet been disclosed. In general, to prevent colorectal cancer or minimize recurrence after treatment, it is necessary to reduce the intake of animal fats, increase the intake of whole grains and vegetables that provide sufficient dietary fiber, and control weight if someone is overweight.

Biomarkers, on the other hand, are becoming a major means of advancing personalized medicine, and are divided into nucleic acid-based biomarkers, which are based on DNA and RNA, and protein-based biomarkers, which are based on proteins and their parts. These biomarkers have recently been applied for early diagnosis of various intractable diseases such as cancer, infectious diseases, cardiovascular diseases, stroke, and dementia, as well as for diagnosis of drug response and treatment.

Most patients with cancer, including colorectal cancer, die primarily as a result of cancer metastasis, despite the use of various existing treatment methods (surgery, chemotherapy, and radiotherapy). Most patients whose primary tumor is observed before cancer metastasis have a high possibility of cure, but such patients are difficult to detect, and in most patients, cancer metastasis is already discovered at the time the primary tumor is observed. Most cancer metastases are multiple and systemic, and their presence is difficult to detect, which is why current cancer therapies do not provide satisfactory treatment efficacy. However, cancer metastasis is an inefficient process in which only a small fraction of the cancer cells that make up the primary tumor successfully complete the various stages of the metastatic process and become metastatic cancer. Therefore, by better understanding the metastatic process, discovering clinically and biologically useful therapeutic targets, and developing methods to effectively inhibit them, it will be possible to develop useful treatments that can effectively control death due to cancer metastasis. In addition, if it is possible to predict prognosis early and diagnose high-risk groups for cancer metastasis early, it can be useful for planning future treatment according to prognosis and for personalized treatment for each patient.

As a prior art, Korean Patent No. 1011443240000 discloses that defensine-5 protein, which is highly expressed in patients with a good prognosis for colorectal cancer, and ROD1 (regulator of differentiation 1) protein, which is highly expressed in patients with a poor prognosis for colorectal cancer, can be used as markers for predicting the prognosis of colorectal cancer. Korean Patent No. 1019251250000 discloses that NCKAP1 (NCK-Associated Protein 1) is overexpressed in the blood and tissues of colorectal cancer patients, and that migration, invasion, and metastasis of cancer cells are inhibited by suppression of NCKAP1, and that the expression level of NCKAP1 can be used to diagnose colorectal cancer or to predict the prognosis of colorectal cancer metastasis. On the other hand, a non-patent reference [Shuai Li et al., Redox Biology 18 (2018) 246-255] discloses that overexpression of NNT in gastric cancer patients is unfavorable for overall survival and disease free survival.

Accordingly, the present inventors identified genes with different expression levels in normal tissues obtained from normal weight colorectal cancer patients, colorectal cancer tissues obtained from normal weight colorectal cancer patients, and colorectal cancer tissues obtained from overweight colorectal cancer patients in order to find biomarkers that can predict the prognosis of colorectal cancer. In particular, the present inventors found seven genes that were uniquely altered in relation to the prognosis of colorectal cancer patients. When these genes were analyzed in conjunction with survival analysis, it was confirmed that NNT (Nicotinamide Nucleotide Transhydrogenase) or OSBPL3 (Oxysterol Binding Protein Like 3) gene could be used to predict the prognosis of colorectal cancer patients, and that it was particularly associated with obese colorectal cancer. In addition, the present invention was completed by confirming that linking the expression of these genes with TNM stage (tumor, node, metastasis stage; TNM stage) can more precisely predict the prognosis of colorectal cancer patients or obese colorectal cancer patients.

SUMMARY OF THE INVENTION

It is an object of the present invention to provide a biomarker for predicting the prognosis of colorectal cancer patients or obese colorectal cancer patients and a method for predicting the prognosis using the biomarker.

To achieve the above object, the present invention provides a composition for predicting the prognosis of a colorectal cancer patient, comprising an agent for measuring the level of mRNA or protein of the NNT and/or OSBPL3 gene.

The present invention also provides a kit for predicting the prognosis of a colorectal cancer patient, comprising a composition containing an agent for measuring the level of mRNA or protein of the NNT and/or OSBPL3 gene.

The present invention also provides a method for predicting the prognosis of a colorectal cancer patient comprising the following steps:
(a) a step of measuring the mRNA level of the NNT and/or OSBPL3 gene or the protein expression level thereof in a sample isolated from a colorectal cancer patient; and
(b) a step of comparing the measured mRNA level or protein level thereof with the mRNA level or protein level thereof of a control sample.

In addition, the present invention provides a method for predicting the prognosis of a colorectal cancer patient comprising the following steps:
(a) a step of measuring the mRNA level of the NNT and/or OSBPL3 gene or the protein level thereof in a sample isolated from a colorectal cancer patient;
(b) a step of comparing the measured mRNA level or protein level thereof with the mRNA level or protein level thereof of a control sample; and
(c) a step of combining and analyzing the information classified according to the TNM stage.

Advantageous Effect

The present invention relates to a biomarker for predicting the prognosis of colorectal cancer by using changes in expression level of NNT and/or OSBPL3, and a prognosis prediction method using same. The expression level of NNT and/or OSBPL3 is analyzed so that the prognosis of colorectal cancer patients in clinical practice can be predicted, and if the analysis is performed in combination with TNM stage, more accurate prediction can be made such that individualized and customized strategies can be designed.

BRIEF DESCRIPTION OF THE DRAWINGS

FIG. 14 is a diagram showing the biological functions that differ between the obese colorectal cancer patients with high NNT gene expression and the obese colorectal cancer patients with low NNT gene expression compared to the normal tissue of the normal weight colorectal cancer patients.

DESCRIPTION OF THE PREFERRED EMBODIMENTS

Hereinafter, the present invention is described in detail.

Figure 1A:
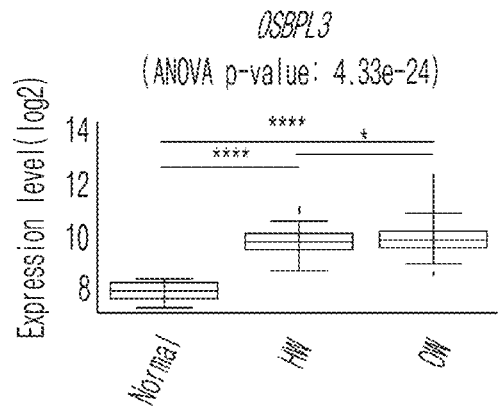
FIG. 1A is a graph showing the gene expression level of OSBPL3 discovered from the TCGA COAD (The Cancer Genome Atlas Colon Adenocarcinoma) data set.
Figure 1B:
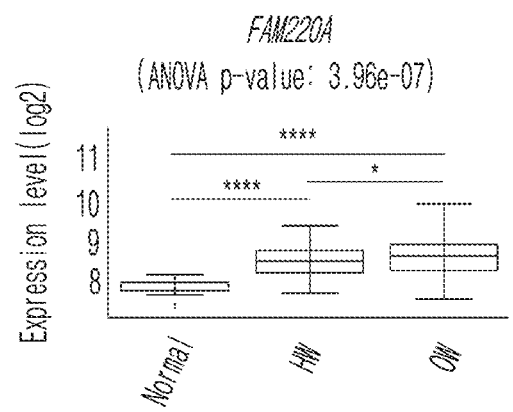
FIG. 1B is a graph showing the gene expression level of FAM220A discovered from the TCGA COAD data set.
Figure 1C:
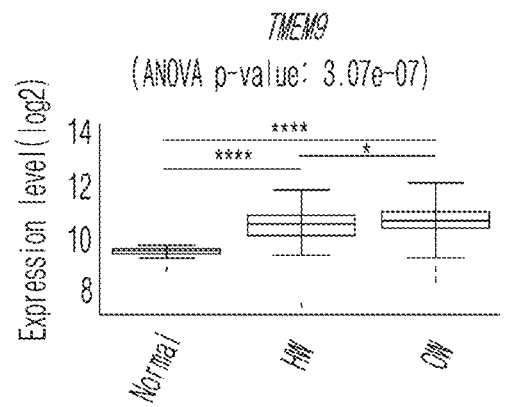
FIG. 1C is a graph showing the gene expression level of TMEM9 discovered from the TCGA COAD data set.
Figure 1D:
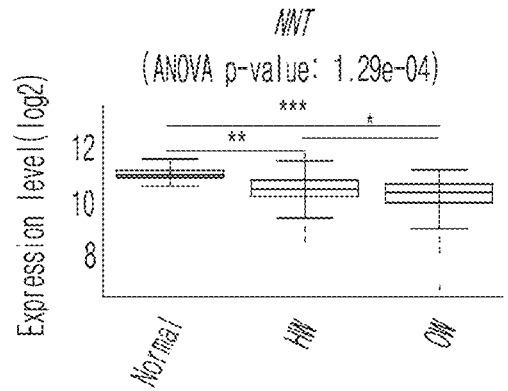
FIG. 1D is a graph showing the gene expression level of NNT discovered from the TCGA COAD data set.
Figure 1E:
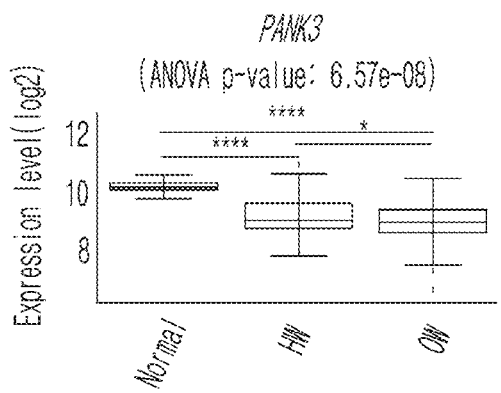
FIG. 1E is a graph showing the gene expression level of PANK3 discovered from the TCGA COAD data set.
Figure 1F:
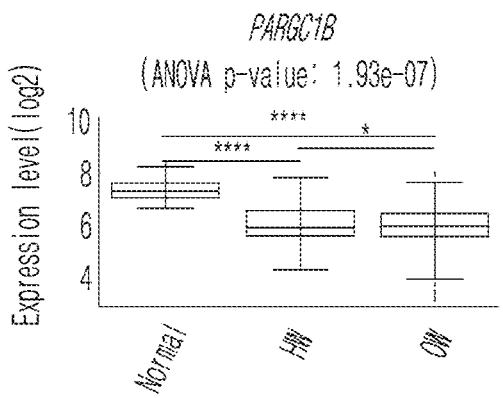
FIG. 1F is a graph showing the gene expression level of PPARGC1B discovered from the TCGA COAD data set.
Figure 1G:
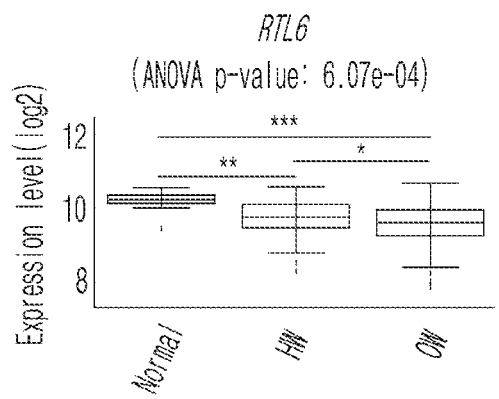
FIG. 1G is a graph showing the gene expression level of RTL6 discovered from the TCGA COAD data set.
Figure 2A:
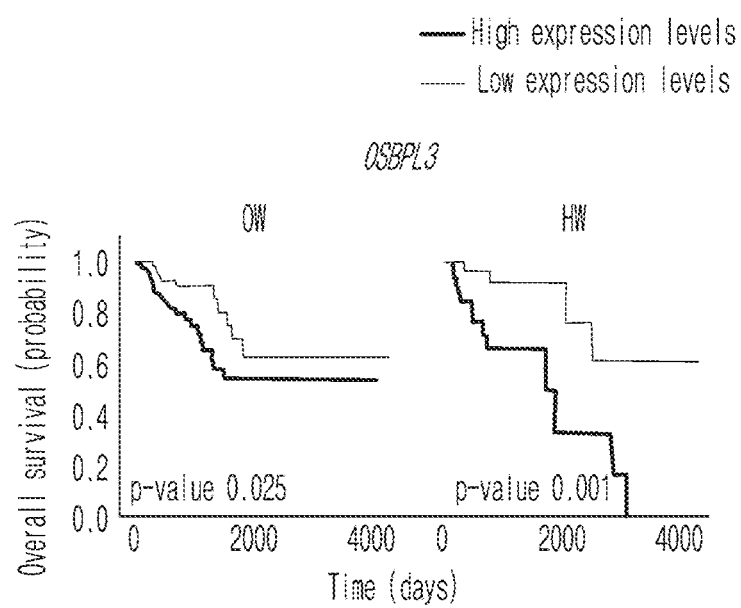
FIG. 2A is a graph showing the analysis of overall survival rate according to the expression pattern of OSBPL3.
Figure 2B:
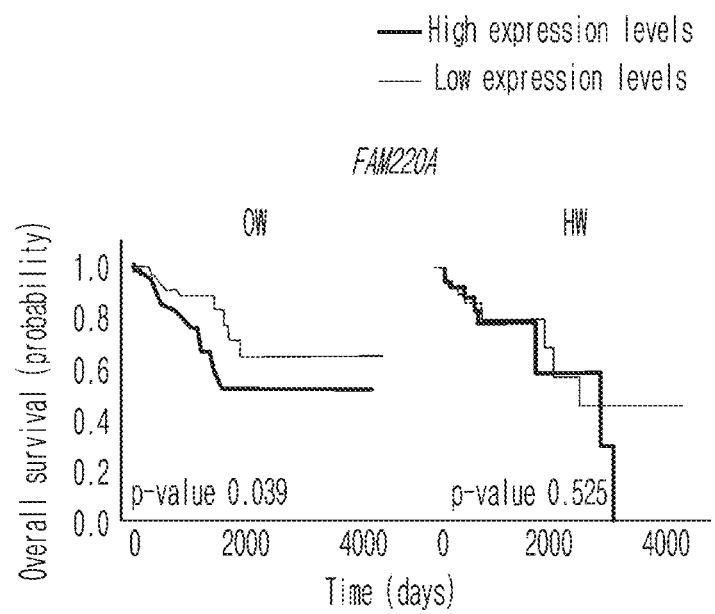
FIG. 2B is a graph showing the analysis of overall survival rate according to the expression pattern of FAM220A.
Figure 2C:
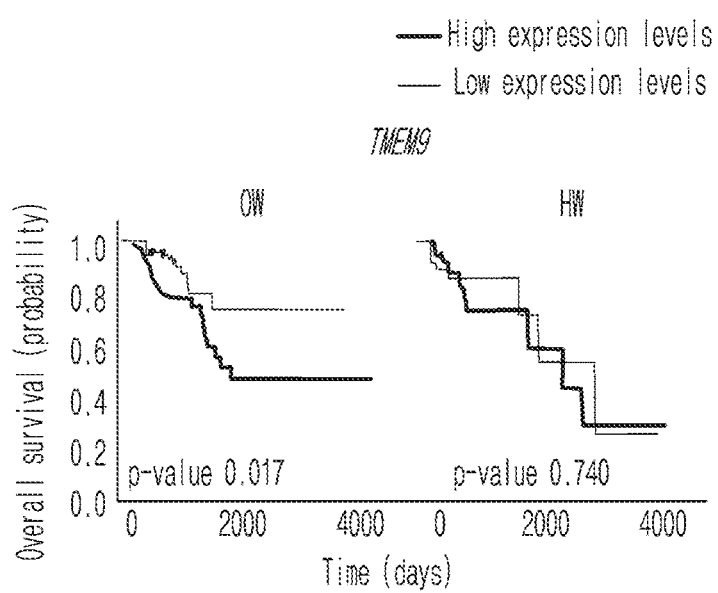
FIG. 2C is a graph showing the analysis of overall survival rate according to the expression pattern of TMEM9.
Figure 2D:
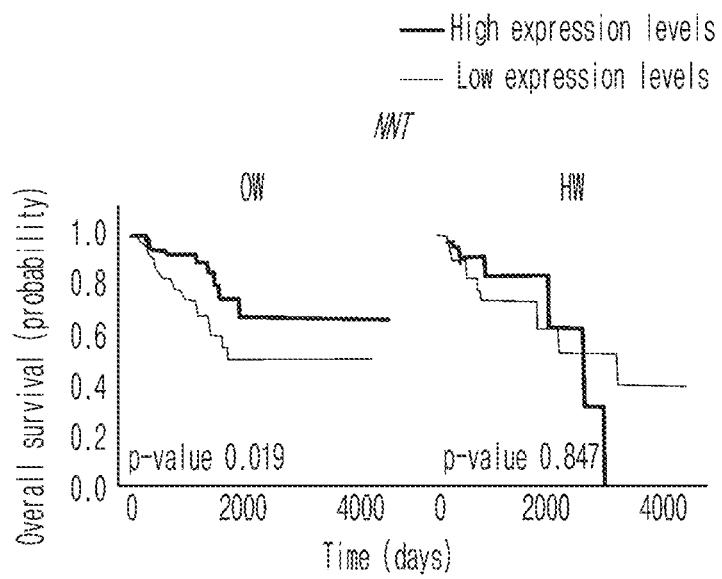
FIG. 2D is a graph showing the analysis of overall survival rate according to the expression pattern of NNT.
Figure 2E:
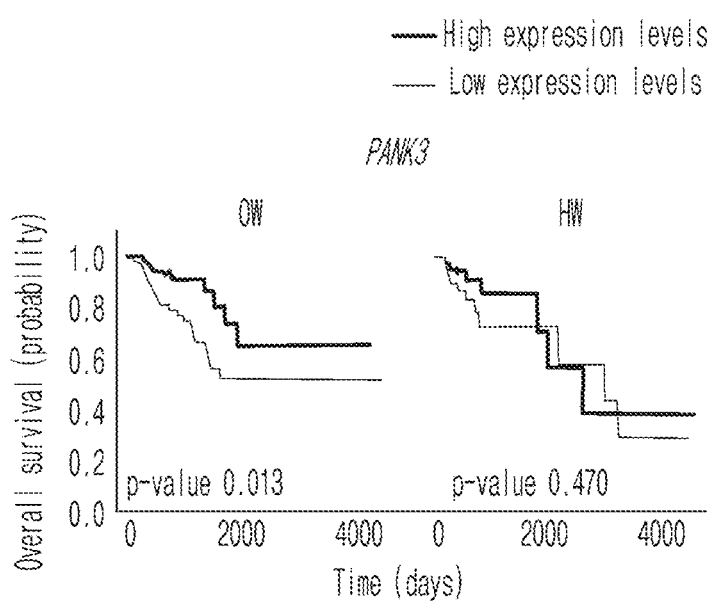
FIG. 2E is a graph showing the analysis of overall survival rate according to the expression pattern of PANK3.
Figure 2F:
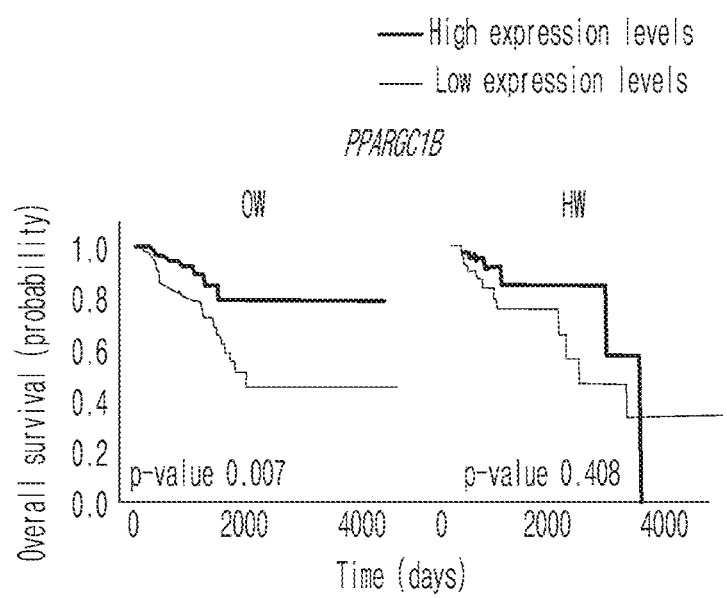
FIG. 2F is a graph showing the analysis of overall survival rate according to the expression pattern of PPARGC1B.
Figure 2G:
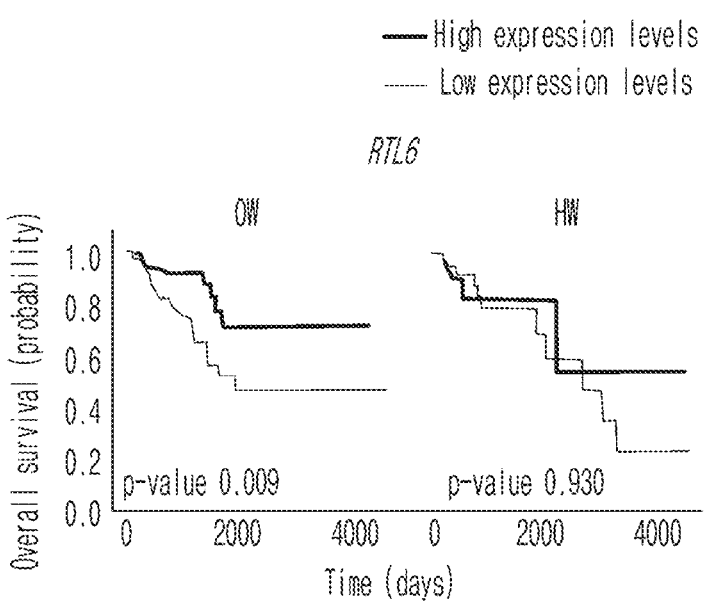
FIG. 2G is a graph showing the analysis of overall survival rate according to the expression pattern of RTL6.
Figure 3A:
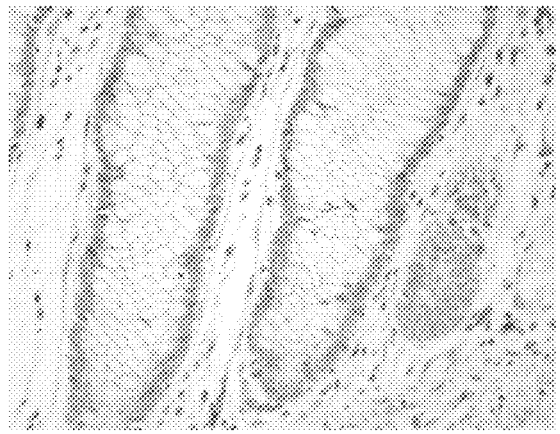
FIG. 3 is a set of photographs showing the results of immunohistochemical staining for NNT in normal colon epithelial cells and tumor cells (A: normal colon epithelial cells showing weak cytoplasmic staining, B: unstained tumor cells, C: tumor cells showing weak cytoplasmic staining, D: tumor cells showing moderate cytoplasmic staining, E: tumor cells showing strong cytoplasmic staining) (magnification: 400×).
Figure 3B:
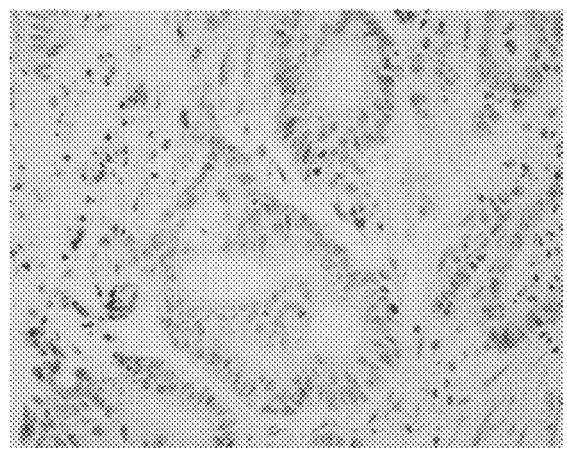
Figure 3C:
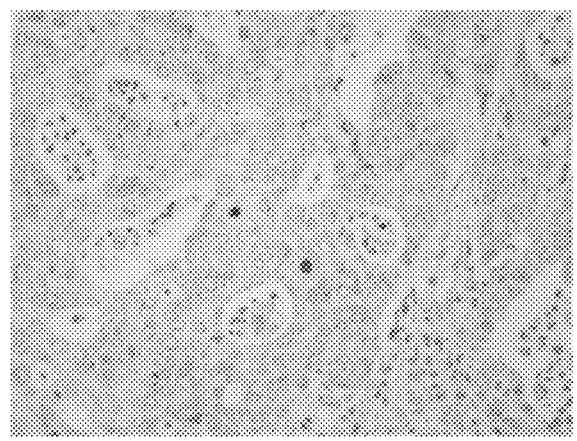
Figure 3D:
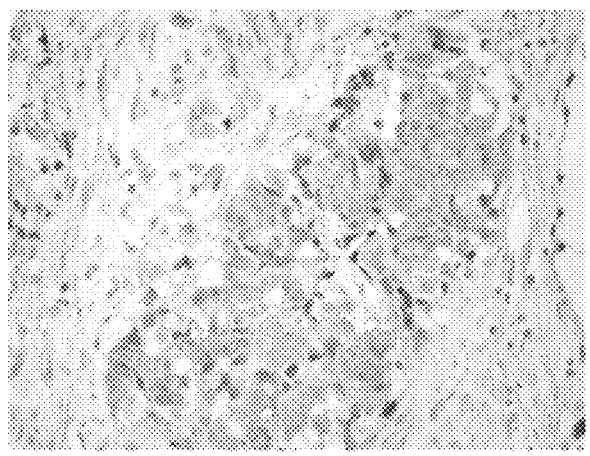
Figure 3E:
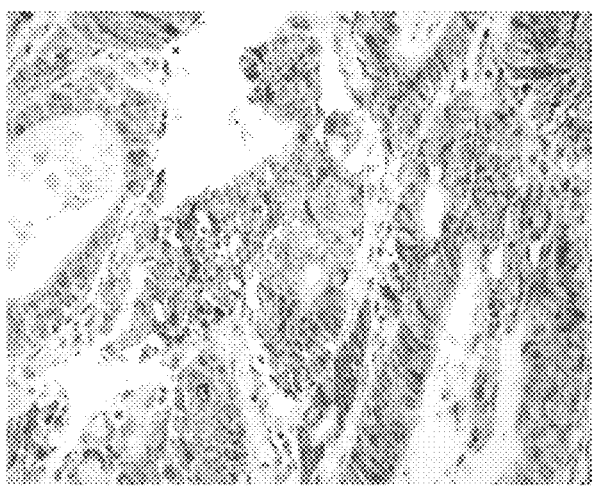
Figure 4A:
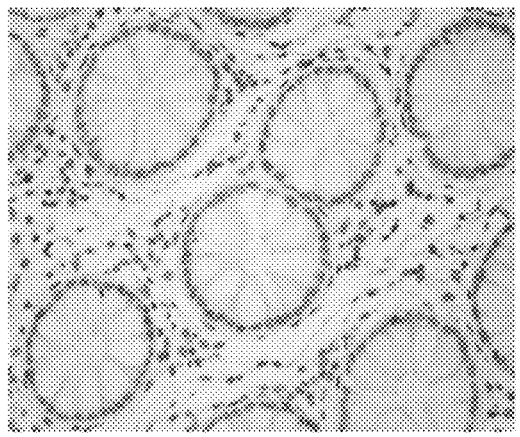
FIG. 4 is a set of photographs showing the results of immunohistochemical staining for OSBPL3 in normal colon epithelial cells and tumor cells (A: unstained normal colon epithelial cells, B: unstained tumor cells, C: tumor cells showing weak cytoplasmic staining, D: tumor cells showing moderate cytoplasmic staining, E: tumor cells showing strong cytoplasmic staining) (magnification: 400×).
Figure 4B:
Figure 4C:
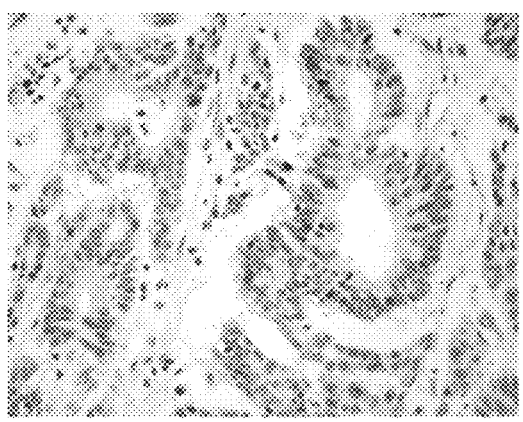
Figure 4D:
Figure 4E:
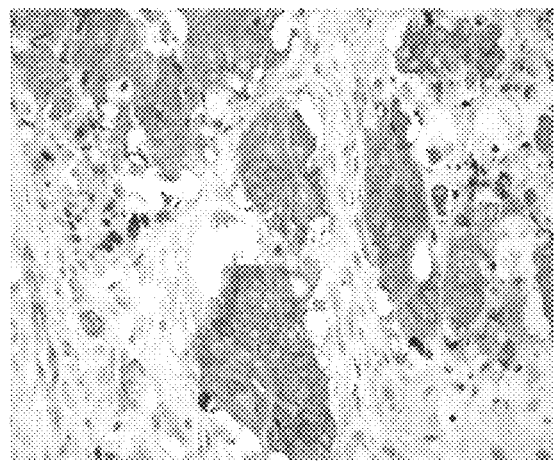
Figure 5A:
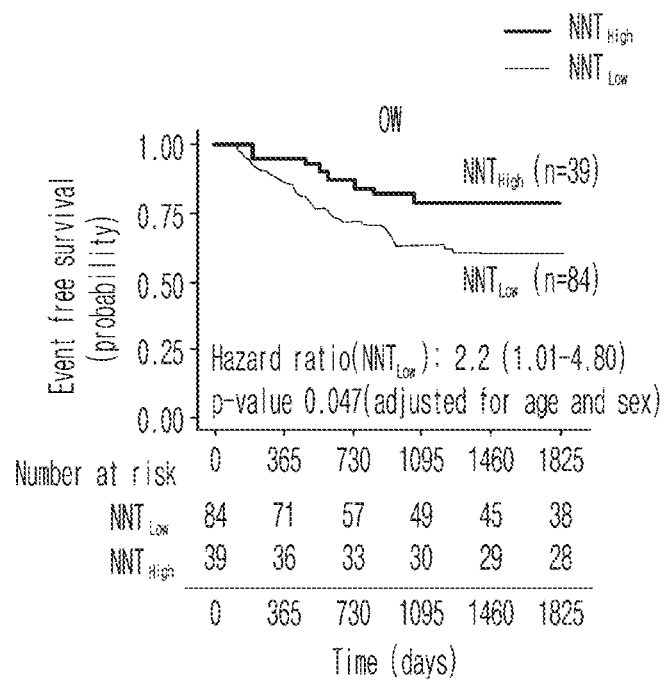
FIG. 5A is a graph showing the event free survival analysis according to the NNT protein expression level in the OW group in the GMC (Gachon University Gil Medical Center) colorectal cancer cohort.
Figure 5B:
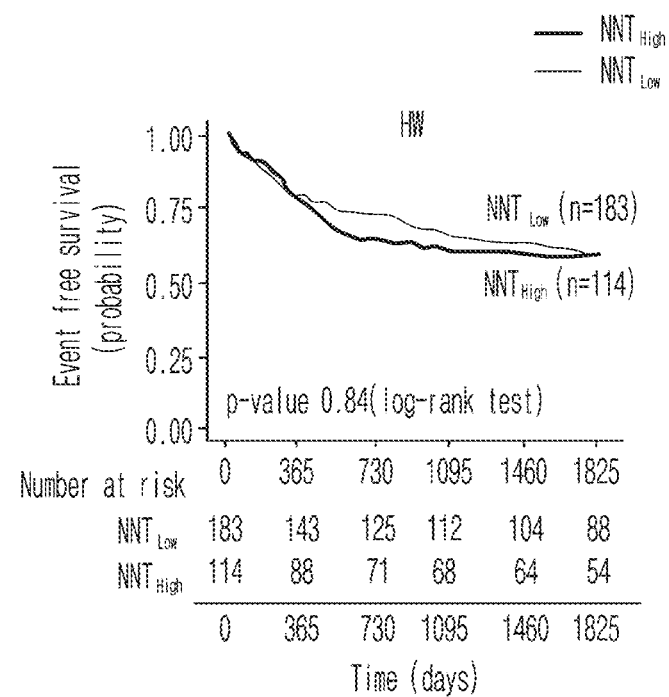
FIG. 5B is a graph showing the event free survival analysis according to the NNT protein expression level in the HW group in the GMC colorectal cancer cohort.
Figure 5C:
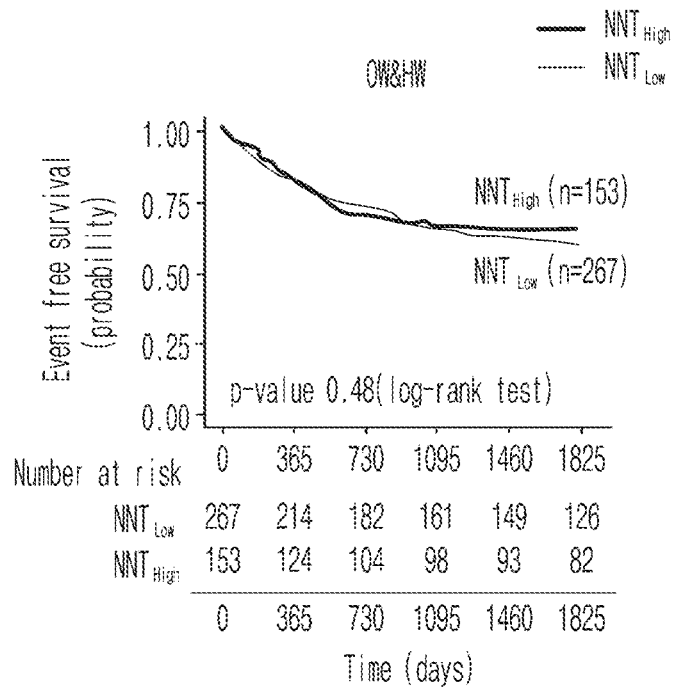
FIG. 5C is a graph showing the event free survival analysis according to the NNT protein expression level in the OW&HW group in the GMC colorectal cancer cohort.
Figure 6A:
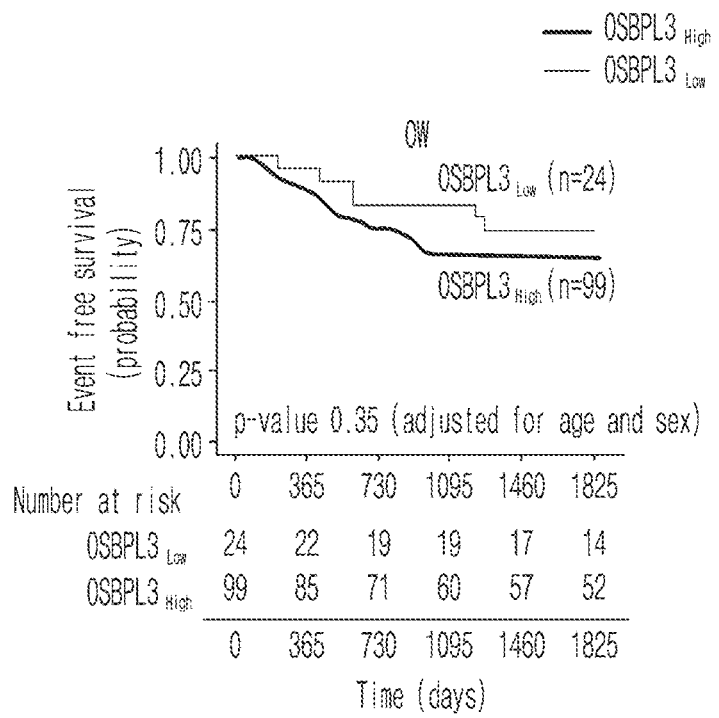
FIG. 6A is a graph showing the event free survival analysis according to the OSBPL3 protein expression level in the OW group in the GMC colorectal cancer cohort.
Figure 6B:
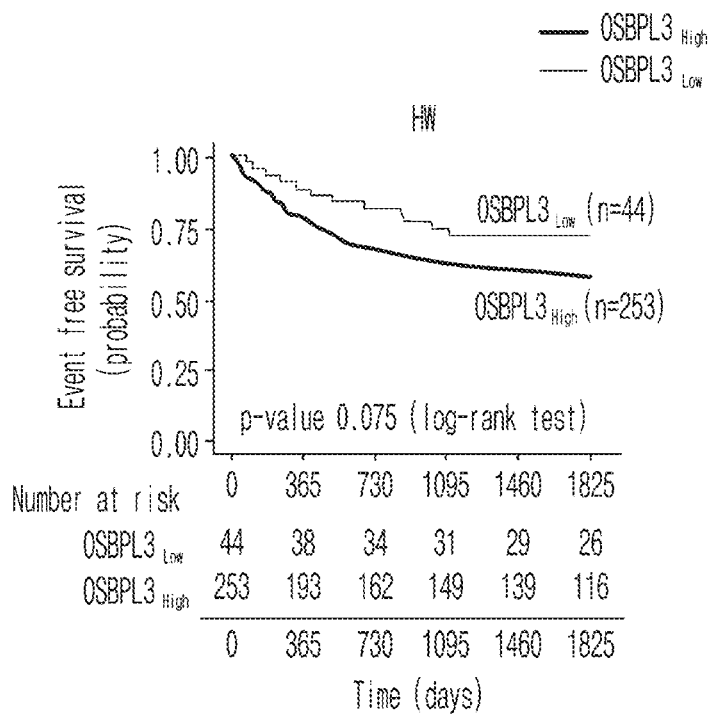
FIG. 6B is a graph showing the event free survival analysis according to the OSBPL3 protein expression level in the HW group in the GMC colorectal cancer cohort.
Figure 6C:
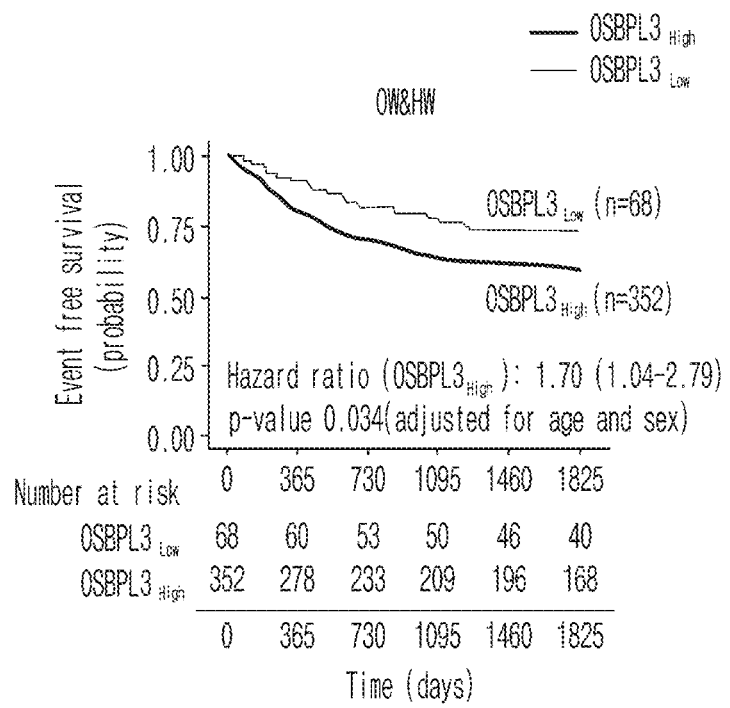
FIG. 6C is a graph showing the event, free survival analysis according to the OSBPL3 protein expression level in the OW&HW group in the GMC colorectal cancer cohort.
Figure 12:
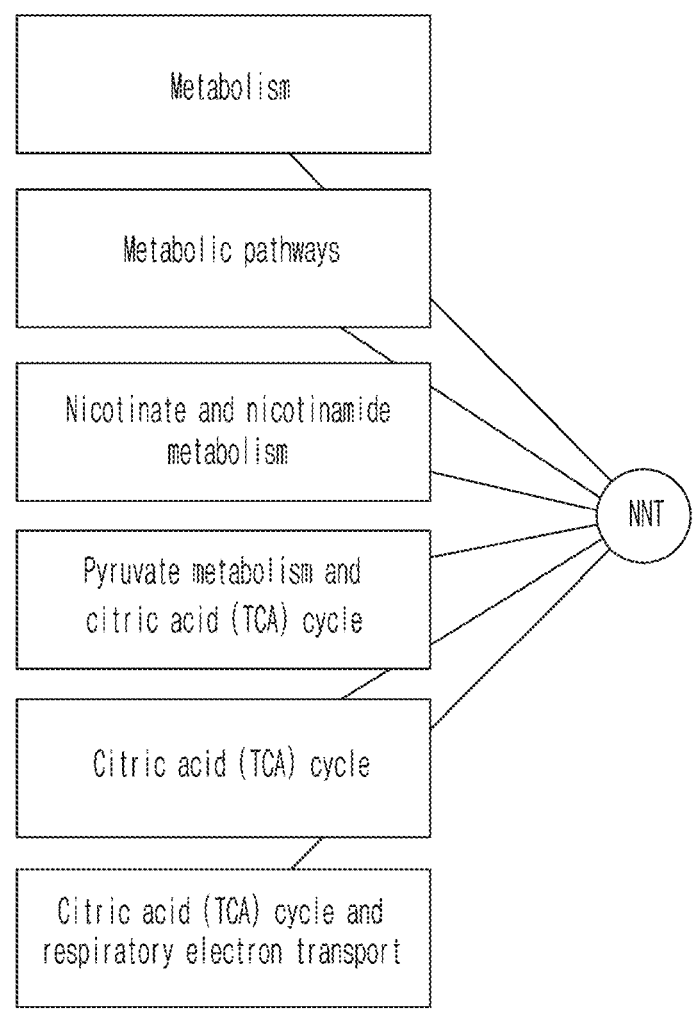
FIG. 12 is a diagram showing the biological functions closely correlated with the NNT gene.
Figure 13A:
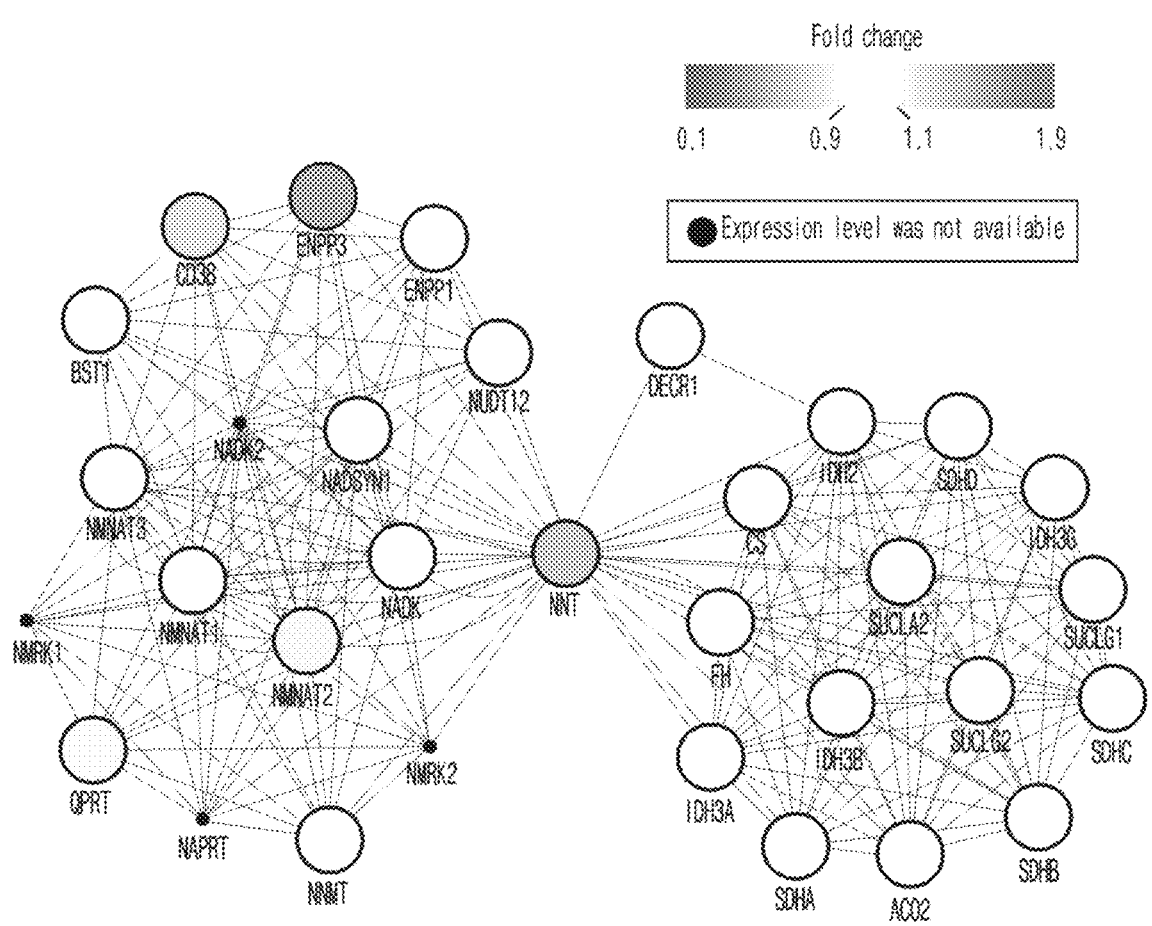
FIG. 13A is a diagram showing the network of proteins closely related to the NNT protein.
Figure 13B:
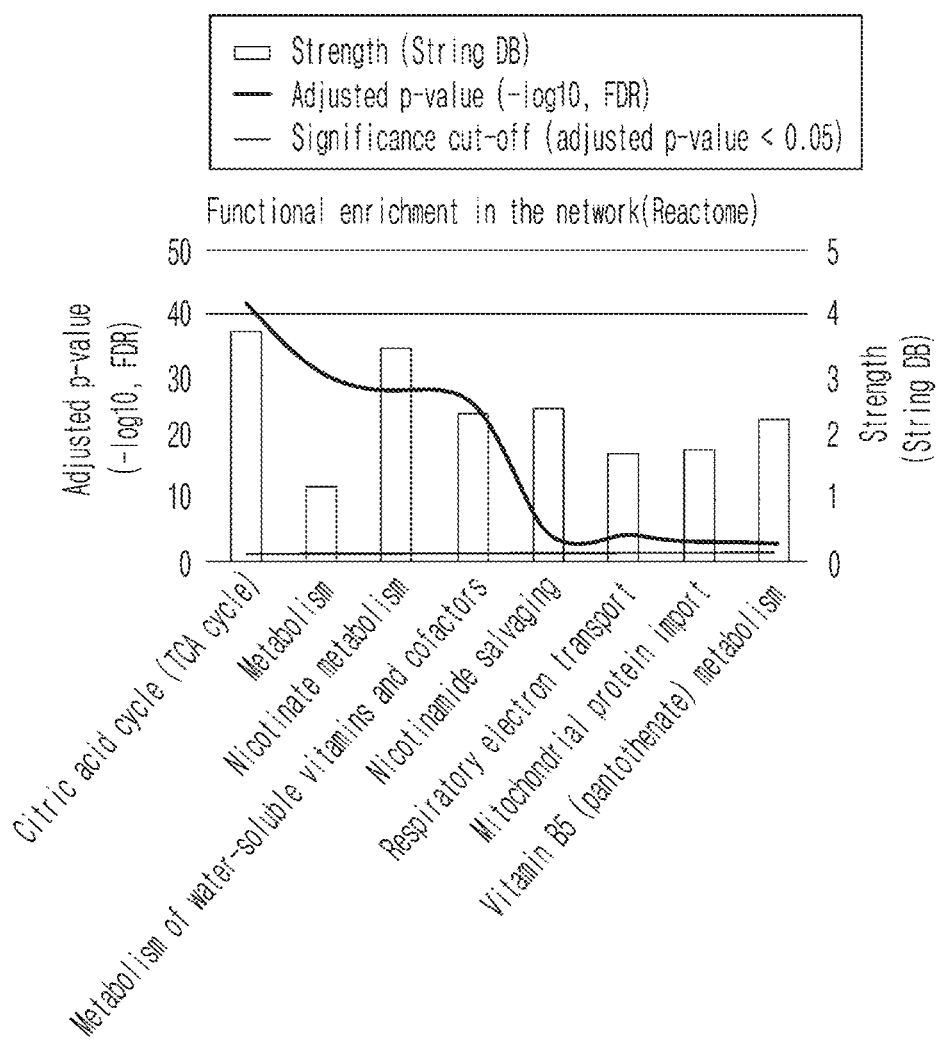
FIG. 13B is a diagram showing the biological functions associated with the proteins participating in the network of proteins closely related to the NNT protein.

In a specific experimental example of the present invention, the present inventors discovered seven genes (NNT, PANK3, PPARGC1B, RTL6, OSBPL3, FAM220A, and TMEM9) whose expression levels were consistently increased or decreased in relation to colorectal cancer, and the differences in expression levels were statistically significant. OSBPL3, FAM220A, and TMEM9 were confirmed to be increased in expression in the normal weight colorectal cancer patient group compared to the normal population, and in the obese colorectal cancer patient group compared to the normal weight colorectal cancer patient group. In addition, NNT, PANK3, PPARGC1B, and RTL6 were confirmed to be decreased in expression in the normal weight colorectal cancer patient group compared to the normal population, and in the obese colorectal cancer patient group compared to the normal weight colorectal cancer patient group (FIGS. 1A to 1G). As a result of analyzing the overall survival according to the expression levels of these genes, in the survival analysis targeting a group of patients with obese colorectal cancer, it was confirmed that the patient group with high expression levels of OSBPL3, FAM220A, and TMEM9 had a disadvantage in survival, and the patient group with low expression levels of NNT, PANK3, PPARGC1B, and RTL6 had a disadvantage in survival (FIGS. 2A to 2G). To perform a survival analysis according to the expression levels of the proteins encoded by these genes, immunohistochemical staining for NNT and OSBPL3 was performed on normal colon epithelial cells and tumor cells, and the expression levels of the proteins encoded by these gene candidates was quantified (FIGS. 3A to 3E, and FIGS. 4A to 4E). In addition, the present inventors performed a survival analysis based on the NNT and OSBPL3 protein expression levels, and confirmed that if the expression level of the NNT gene is higher than that of the control group, the prognosis of colorectal cancer patients is favorable (FIGS. 5A to 5C). On the other hand, it was confirmed that the prognosis of colorectal cancer patients can be judged to be good when the expression level of the OSBPL3 gene is lower than that of the control group (FIGS. 6A to 6C). In addition, it was confirmed that the patients with lower expression level of the NNT gene and higher expression level of the OSBPL3 gene than the control group had a poorer prognosis (FIGS. 7A to 7C, and FIGS. 8A to 8C). In addition, the present inventors confirmed that better survival prediction is possible when event free survival analysis and disease specific survival analysis are performed by combining the TNM stage (tumor, node, metastasis stage) and NNT expression level (FIGS. 9A to 9F, FIGS. 10A to 10F, and FIGS. 11A to 11C). In addition, the biological functions or protein networks that were closely correlated with the NNT gene and protein were identified to nicotinate and nicotinamide metabolism, pyruvate metabolism, and TCA cycle (FIGS. 12, 13A and 13B). The obese and $NNT_{low}$ groups, which were identified as being disadvantageous for survival, were confirmed to have statistically significant suppression of nicotinate and nicotinamide metabolism, inositol phosphate metabolism, and purine metabolism compared to the normal group (FIG. 14).

The present invention provides a composition for predicting the prognosis of a colorectal cancer patient, comprising an agent for measuring the level of mRNA or protein of the NNT and/or OSBPL3 gene.

The NNT is an enzyme that catalyzes the following chemical reaction.

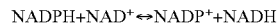

The above enzyme is an oxidoreductase that acts on NADH or NADPH using NAD+ or NADP+ as an acceptor. This enzyme participates in nicotinate and nicotinamide metabolism.

The above enzymes can be referred to as NADPH:NAD$^+$ oxidoreductase, pyridine nucleotide transhydrogenase, transhydrogenase, NAD(P)$^+$ transhydrogenase, nicotinamide adenine dinucleotide (phosphate) transhydrogenase, NAD$^+$ transhydrogenase, NADH transhydrogenase, NADPH-NAD$^+$ transhydrogenase, pyridine nucleotide transferase, NADPH-NAD$^+$ oxidoreductase, NADH-NADP$^+$-transhydrogenase, NADPH:NAD$^+$ transhydrogenase, H$^+$-Thase, and energy-linked transhydrogenase.

The said OSBPL3 is a member of the oxysterol-binding protein (OSBP) family, a group of intracellular lipid receptors.

The above colorectal cancer patients may be obese.

The obesity can be determined by measuring the obesity-related indices including the patient's body mass index (BMI), waist-hip ratio (WHR), waist circumference (WC), waist-stature ratio (WSR), body fat percentage (BF %), and relative fat mass (RFM), preferably based on the patient's BMI.

BMI is calculated by dividing weight (kg) by the square of height (m), and is one of the methods to determine obesity. The criteria for determining obesity may vary slightly, but the World Health Organization considers the BMI of 25 or higher to be overweight and 30 or higher to be obese. The World Health Organization Asia-Pacific Region and the Korean Society of Obesity define the BMI of 23 or higher to be overweight and 25 or higher to be obese, taking into account racial characteristics. In one embodiment of the present invention, TCGA data is mostly based on Western patients, so the Western standard of BMI 25 or more is applied as overweight and 30 or more as obese, and TMA analysis is based on Korean patients, so the Korean standard of BMI 23 or more is applied as overweight and 25 or more as obese.

The present invention provides a composition for predicting the prognosis of a colorectal cancer patient, comprising an agent for measuring the level of mRNA or protein of the NNT and/or OSBPL3 gene.

The agent for measuring the level of mRNA may include a primer or a probe, but not always limited thereto.

The above primer is a nucleic acid sequence having a short free 3' hydroxyl group that can form complementary base pairs with a template and functions as a starting point for replicating the template strand. The primers can initiate DNA synthesis in the presence of the reagents for the polymerization reaction (i.e., DNA polymerase or reverse transcriptase) and the different four nucleoside triphosphates in an appropriate buffer and at a proper temperature.

The probe may be a probe capable of binding complementarily to a target gene, and the nucleotide sequence of the probe is not limited as long as it is capable of binding complementarily to each gene.

The method for measuring the mRNA expression level includes RT-PCR (reverse transcription polymerase chain reaction), competitive RT-PCR, real-time RT-PCR, RNase protection assay (RPA), Northern blotting, and a method utilizing DNA chips, but not always limited thereto.

The agent for measuring the level of the protein may be an antibody, a peptide, an aptamer or a compound specific for the protein.

The said antibody refers to a protein molecule capable of specifically binding to an antigenic site on a protein or peptide molecule. Such antibodies can be produced by cloning each gene into an expression vector according to a conventional method to obtain a protein encoded by the marker gene, and by a conventional method from the obtained protein. The form of the above antibody is not particularly limited, and a polyclonal antibody, a monoclonal antibody, or a part thereof having antigen binding property may be included in the antibody of the present invention, and any immunoglobulin antibody may be included. In addition, the antibody of the present invention may include a special antibody such as a humanized antibody. Furthermore, the antibody comprises a functional fragment of an antibody molecule as well as a complete form having two full-length light chains and two full-length heavy chains. The functional fragment of an antibody molecule means a fragment that possesses at least an antigen-binding function, and can be Fab, F(ab'), F(ab') 2, and Fv, etc.

The above peptide has the advantage of high binding to the target substance and does not undergo denaturation even when treated with heat or chemicals. In addition, since the above peptide has a small molecular size, it can be attached to other protein and used as a fusion protein. Specifically, it can be attached to a polymer protein chain, which can be used as a diagnostic kit and a drug delivery material.

The above aptamer refers to a single-stranded oligonucleotide, which is a nucleic acid molecule having binding activity for a specific target molecule. The above aptamer can have various three-dimensional structures depending on its nucleotide sequence and can have a high affinity for a specific substance, such as an antigen-antibody reaction. Aptamers can inhibit the activity of a specific target molecule by binding to the target molecule. Aptamers can be used as a replacement for antibodies because they are composed of polynucleotides that can specifically bind to antigenic substances in the same way as antibodies, but are more stable than proteins, have a simpler structure, and are easy to synthesize.

The method for measuring the protein level includes Western blot, enzyme linked immunosorbent assay (ELISA), radioimmunoassay (RIA), radioimmunodiffusion, ouchterlony immunodiffusion, rocket immunoelectrophoresis, tissue immunostaining, immunoprecipitation assay, complement fixation assay, FACS, and a method utilizing DNA chips, but not always limited thereto.

The present invention also provides a kit for predicting the prognosis of a colorectal cancer patient, comprising a composition containing an agent for measuring the level of mRNA or protein of the NNT and/or OSBPL3 gene.

The above kit may include an RT-PCR kit, a DNA chip kit, an ELISA kit, a protein chip kit, a rapid kit, or an MRM (multiple reaction monitoring) kit, but not always limited thereto.

The present invention also provides a method for predicting the prognosis of a colorectal cancer patient comprising the following steps:
(a) a step of measuring the mRNA level of the NNT and/or OSBPL3 gene or the protein expression level thereof in a sample isolated from a colorectal cancer patient; and
(b) a step of comparing the measured mRNA level or protein level thereof with the mRNA level or protein level thereof of a control sample.

If the mRNA expression level or the protein expression level of the NNT gene is higher than that of the control group, it can be judged that the prognosis will be good.

If the mRNA expression level or the protein expression level of the OSBPL3 gene is lower than that of the control group, it can be judged that the prognosis will be good. The above judgment of a good prognosis may mean that the event free survival, disease specific survival, and overall survival are higher than in the group with a poor prognosis.

The sample of the above step (a) may be colon tissue.

In addition, the present invention provides a method for predicting the prognosis of a colorectal cancer patient comprising the following steps:
(a) a step of measuring the mRNA level of the NNT and/or OSBPL3 gene or the protein level thereof in a sample isolated from a colorectal cancer patient;

(b) a step of comparing the measured mRNA level or protein level thereof with the mRNA level or protein level thereof of a control sample; and (c) a step of combining and analyzing information classified according to TNM stage.

The TNM stage is one way to determine the stage of a tumor. T stands for tumor, and depending on the depth of invasion into the organ wall, it is divided into T0 (no primary tumor), Tis (carcinoma in situ), and T1 to T4 (the higher the number, the more invasion around it), etc. N stands for node (lymph node), and depending on the number, size, and location of the invaded lymph nodes, it is divided into N0 (no lymph node metastasis), and N1 to N3, etc. M stands for metastasis, and depending on the presence or absence of remote metastasis, it is divided into M0 (no metastasis), and M1 (metastasized), etc. Once T, N, and M are determined using the above methods they are combined to determine the final stage of a disease. The stage determined in this way is very important in determining treatment plan and prognosis.

The information categorized according to the TNM stage above is the most common way to provide prognostic information for cancer and can be divided into stages 1 through 4. However, there is a problem that predicting the prognosis of an individual patient is incomplete because the TNM stage does not include all the important variables that affect the prognosis in order to simplify the stage setting.

In the present invention, the event free survival period refers to the period of time after a patient undergoes curative surgery during which death occurs due to inoperable disease progression, recurrence of cancer, complications, etc.

In the disease specific survival analysis of the present invention, deaths due to colorectal cancer were categorized as death (event), and censored deaths due to causes other than colorectal cancer were categorized as survival.

In one embodiment of the present invention, when the event free survival was analyzed based solely on the TNM stage, the event free survival risk rate of the patients with TNM stage 3/4 was 12.07 times higher than that of the patients with TNM stage 1/2. On the other hand, when the NNT and TNM stage were combined for analysis, the event free survival risk rate of the patients with high NNT expression and TNM stage 3/4 was 8.39 times higher than that of the patients with high NNT expression and TNM stage 1/2, and the event free survival risk rate of the patients with low NNT expression and TNM stage 3/4 was 21.2 times higher than that of the patients with high NNT expression and TNM stage 1/2. In addition, in the patients with the same stage (TNM stage 3/4), the event free survival risk rate of the group with low NNT expression was 2.52 times higher than that of the group with high NNT expression, which was statistically significantly worse prognosis.

In one embodiment of the present invention, when the disease specific survival was analyzed based solely on the TNM stage, the event free survival risk rate of the patients with TNM stage 3/4 was 8.33 times higher than that of the patients with TNM stage 1/2. On the other hand, when NNT and TNM stages were combined for analysis, the event free survival risk rate of the patients with high NNT expression and TNM stage 3/4 was 6.25 times higher than that of the patients with high NNT expression and TNM stage 1/2, and the event free survival risk rate of the patients with low NNT expression and TNM stage 3/4 was 14.05 times higher than that of the patients with high NNT expression and TNM stage 1/2. In addition, in the patients at the same stage (TNM stage 3/4), the event free survival risk rate of the group with low NNT expression was 2.23 times higher than that of the group with high NNT expression, which was statistically significantly worse prognosis. In addition, the present inventors confirmed that the event free survival rate of the group with low OSBPL3 expression was higher than that of the group with high OSBPL3 expression in the patients at the same stage (TNM stage 3/4). Therefore, a combined analysis of the expression levels of NNT and/or OSBPL3 and the TNM stage may provide a more precise prognosis prediction.

Hereinafter, the present invention will be described in detail by the following experimental examples.

However, the following experimental examples are only for illustrating the present invention, and the contents of the present invention are not limited thereto.

Experimental Example 1: Discovery of Biomarkers for Predicting Colorectal Cancer Prognosis Using a genomic database, the present inventors identified genes whose expression levels were consistently increased or decreased in association with colorectal cancer, and whose differences in expression were statistically significant.

Specifically, to discover the genes specifically expressed in the obese colorectal cancer patients, the gene expression data set and clinical information data set among the colon adenocarcinoma (COAD) data sets of TCGA (The Cancer Genome Atlas) project were downloaded from the UCSC cancer genomics browser. From the clinical information data set, 417 samples with an initial diagnosis age of 40 years or older were extracted from a total of 434 colorectal cancer samples, and 414 primary tumor and adjacent normal tissue samples were extracted. Of these, 268 samples for which weight and height could be confirmed at the time of initial diagnosis were used in the experiment. In the process of discovering genes specifically expressed in the obese colorectal cancer patients, the expression levels of specific genes were divided into the following three groups. 1) Gene expression levels in normal tissues of normal weight people (hereinafter referred to as Normal), 2) Expression levels in tissues of normal weight colorectal cancer patients (hereinafter referred to as HW), 3) Expression levels in tissues of overweight and obese colorectal cancer patients (BMI>=25, hereinafter referred to as OW). Among these genes, only those whose expression levels were in the order of OW>HW>Normal (hereinafter, UP-ward) or Normal>HW>OW (hereinafter, DOWN-ward), and whose gene expression level differences in each group were statistically significant were found (normal sample number=9, HW sample number=78, OW sample number=184). To test statistical significance, one-way ANOVA was performed for group comparisons, and Tukey's multiple comparison analysis was performed for intergroup comparisons. R version 4.0 was used for the statistical test.

As a result, as shown in FIGS. 1A to 1G, it was confirmed that the expression levels of OSBPL3 (Oxysterol Binding Protein Like 3), FAM220A (Family With Sequence Similarity 220 Member A), and TMEM9 (Transmembrane Protein 9) genes were statistically significantly increased in the HW group compared to the Normal group, and in the HW group compared to the OW group. In addition, it was confirmed that the expression levels of NNT (Nicotinamide Nucleotide Transhydrogenase), PANK3 (Pantothenate Kinase 3), PPARGC1B (Peroxisome Proliferator Activated Receptor Gamma Coactivator 1 Beta), and RTL6 (Retrotransposon Gag Like 6) genes were statistically significantly decreased in the HW group compared to the Normal group, and in the OW group compared to the HW group (*: p-value<0.05, : p-value<0.01, *: p-value<0.001).

Survival analysis was performed on the seven gene candidates found in this way. Herein, the present inventors confirmed that the genes showing statistically significant differences as candidate biomarkers for prognosis prediction.

Specifically, the survival analysis according to the gene expression level in the TCGA COAD data set was performed using the log-rank test, a univariate analysis for overall survival (HW sample number=78, OW sample number=184).

As a result, as shown in FIGS. 2A to 2G, in the survival analysis on the OW group, the patients with high expression of OSBPL3, FAM220A, and TMEM9 were unfavorable for survival. Furthermore, in the survival analysis of the OW group, patients with low expression of NNT, PANK3, PPARGC1B, and RTL6 were unfavorable for survival.

Experimental Example 2: Survival Analysis According to NNT and/or OSBPL3 Protein Expression Level In order to perform a survival analysis according to the expression level of the proteins encoded by NNT and OSBPL3, among the seven genes discovered from the TCGA colorectal cancer gene expression data set, a tissue microarray was constructed from the tumor tissues derived from colorectal cancer patients, and the expression level of the proteins encoded by the candidate genes specifically expressed in obese colorectal cancer patients was quantified by immunohistochemical staining.

Specifically, the study was conducted on patients who underwent colorectal cancer surgery at Gachon University Gil Medical Center (GMC) from April 2010 to January 2013. Patients who underwent surgery for primary colorectal cancer and patients whose tumors were preserved in paraffin blocks were included in the study, and a total of 476 patients were analyzed. Patients with recurrent colorectal cancer, patients whose normal colonic structure had been altered by previous surgery, patients who had received chemotherapy or abdominal radiation therapy prior to colorectal cancer surgery, and patients who had been treated for other cancers prior to colorectal cancer surgery were excluded. After microdissecting the paraffin blocks, Hematoxyling and Eosin (H&E) staining was performed, the pathological findings were reviewed, and two tumor cores were marked on the corresponding paraffin blocks. Cylindrical tumor tissue with a diameter of 2 mm was extracted using a tissue microarray machine and transferred to a new paraffin block. A new tissue microarray (TMA) block was created by inserting each cylindrical tissue from 69 patients into a single paraffin block. The above TMA block was cut into 4 μm thick sections using a microtome, flattened by pulling out wrinkles, and attached to a slide in a certain orientation to dry. Next, immunohistochemical staining was performed using the dried slides. The slides were treated at 601 for 10 minutes, deparaffinized with xylene, rehydrated using different concentrations of alcohol (100% alcohol, 95% alcohol, 80% alcohol, and 70% alcohol), and then washed with distilled water. Then, for antigen recovery, 10 mM citrate buffer solution (citric acid 2.1 g in $H_2O$ 1 L, pH 6.0) was heated and when it started to boil, the slides were placed therein, boiled for another 10 minutes, and the slides were washed in cold water for 10 minutes, taken out, and washed in PBS buffer solution (NaCl 8 g, KCl 200 mg, $Na_2HPO_4$ 1.44 g, $KH_2PO_4$ 24 mg in 1 L $H_2O$). Afterwards, the endogenous peroxidase activity was inhibited by treatment with 3% hydrogen peroxide for 10 minutes, and the antigen was recovered in 0.01 M sodium citrate buffer (pH 6.0) using a microwave oven. To prevent non-specific reactions, the slides were reacted with a blocking antibody (DAKO #X0909; Glostrup., Denmark) for 10 minutes at room temperature, and the samples were reacted in a humidified container at 4° C. with anti-NNT (1:250, #NBP1-32109, Novus Biological Inc., Littleton, CO, USA) and anti-OSBPL3 (1:200, #NBP1-82968, Novus Biological Inc., Littleton, CO, USA). The tissue slides were processed with a non-biotinylated horseradish-peroxidase (HRP) detection system according to the manufacturer's instructions (Gene Tech).

Meanwhile, statistical analysis was performed as follows. In the present invention, the survival-related factors and survival rates at 5 years after colorectal cancer surgery were the focus of event free survival and disease specific survival analyses. In the event free survival analysis, events were defined as deaths from cancer progression, cancer recurrence, and colorectal cancer. Disease specific survival was defined as the time from surgery to death due to colorectal cancer, excluding deaths due to diseases other than colorectal cancer. The log-rank test and CPH (Cox proportional hazard) modeling for survival analysis were performed using the survival package of R version 4.0. Hazard rates for each variable obtained from the CPH model were visualized with the forestmodel package and used under R version 4.0.

The results of immunohistochemical staining for NNT in normal colon epithelial cells and tumor cells are shown in FIG. 3. FIG. 3A is a photograph showing the normal colon epithelial cells showing weak cytoplasmic staining, and FIGS. 3B to 3E are photographs showing the unstained tumor cells, the tumor cells showing weak cytoplasmic staining, the tumor cells showing moderate cytoplasmic staining, and the tumor cells showing strong cytoplasmic staining, respectively. In addition, the results of immunohistochemical staining for OSBPL3 in normal colon epithelial cells and tumor cells are shown in FIG. 4. FIG. 4A is a photograph showing the unstained normal colon epithelial cells, and FIGS. 4B to 4E are photographs showing the unstained tumor cells, the tumor cells showing weak cytoplasmic staining, the tumor cells showing moderate cytoplasmic staining, and the tumor cells showing strong cytoplasmic staining, respectively.

As a result of statistical analysis, as shown in FIGS. 5A to 5C, it was confirmed that the event free survival of colorectal cancer patients significantly differed according to the expression level of NNT protein in the OW group. The event free survival risk rate of the OW group patients with low expression of NNT protein was 2.2 times higher than that of the patients with high expression of NNT protein (95% confidence interval [CI]: 1.01-4.80), and the p-value of the CPH model corrected with gender and age was 0.047, which was statistically significant. Meanwhile, as shown in FIGS. 6A to 6C, in the case of OSBPL3 protein, in the OW group patients obtained from the GMC colorectal cancer cohort, the group with high OSBPL3 expression tended to have a higher event free survival risk rate than that of the group with low OSBPL3 expression. In addition, when all patients were targeted regardless of weight status, the event free survival risk rate of patient group with high expression of OSBPL3 protein was 1.7 times higher than that of the patient group with low expression of OSBPL3 protein (95% CI: 1.04-2.79), and the p-value of the CPH model corrected with gender and age was 0.034, which was statistically significant.

Figure 7A:
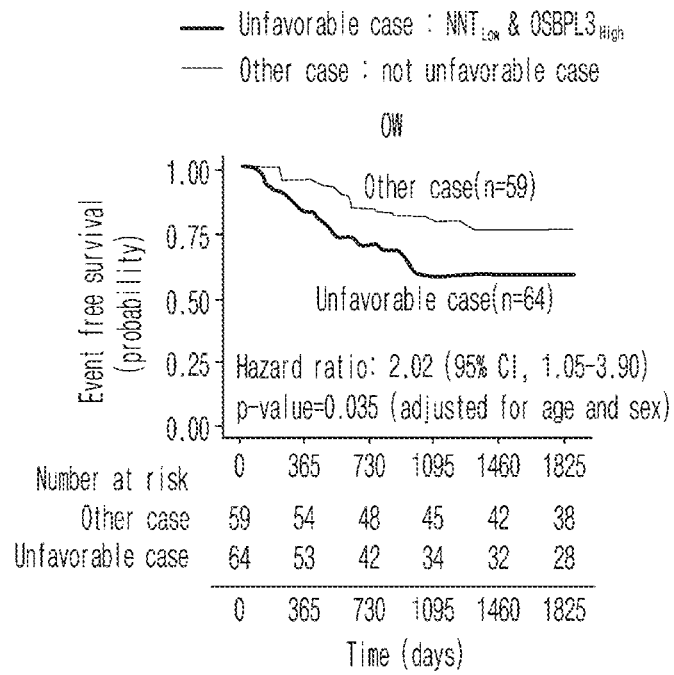
FIG. 7 is a set of graphs showing the event free survival analysis according to the NNT and OSBPL3 protein expression levels in the OW (FIG. 7A), HW (FIG. 7B), and OW&HW groups (FIG. 7C) in the GMC colorectal cancer cohort.
Figure 7B:
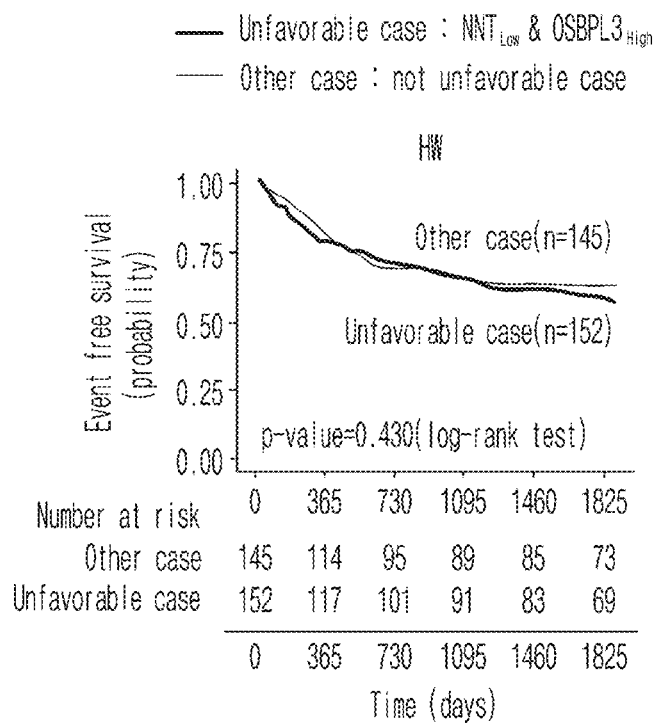
Figure 7C:
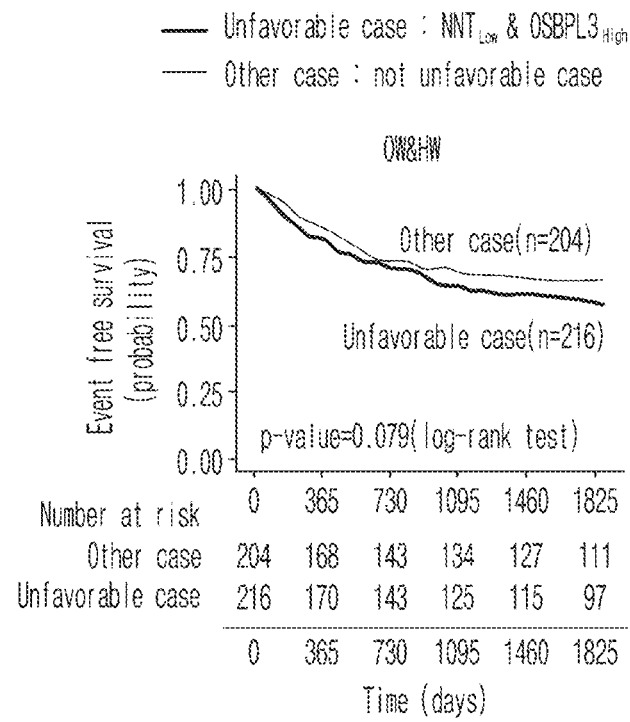
Figure 8A:
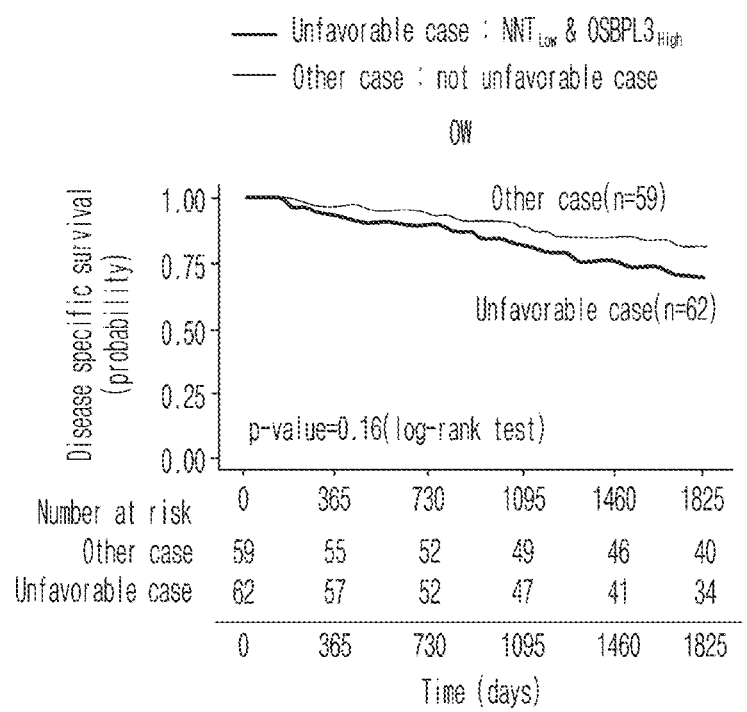
FIG. 8 is a set of graphs showing the disease specific survival analysis according to the NNT and OSBPL3 protein expression levels in the OW (FIG. 8A), HW (FIG. 8B), and OW&HW groups (FIG. 8C) in the GMC colorectal cancer cohort.
Figure 8B:
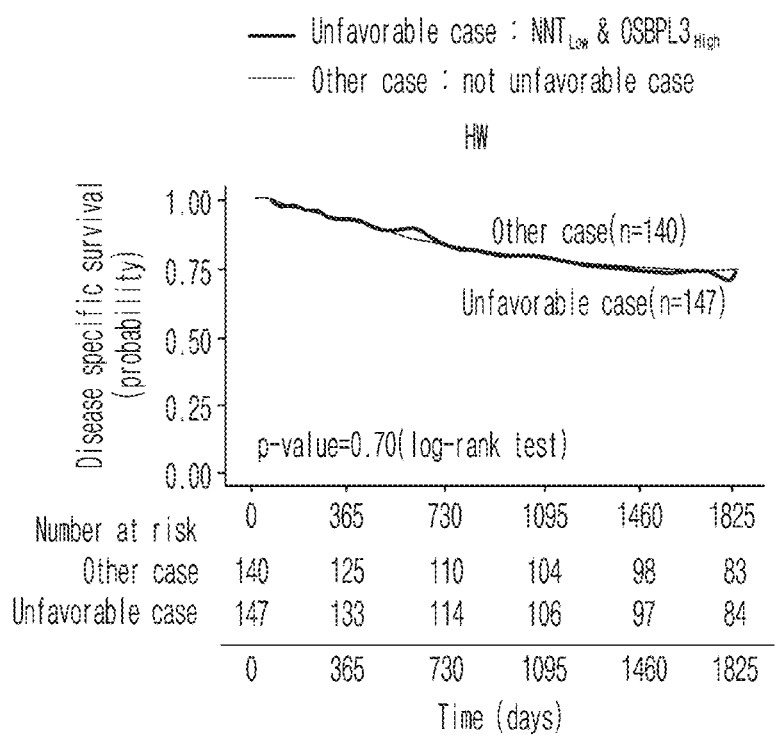
Figure 8C:
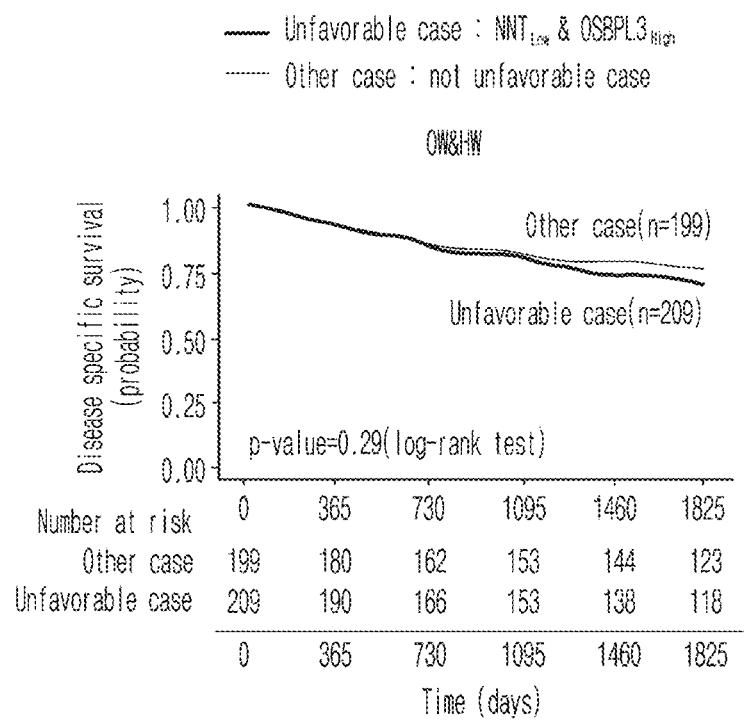

In addition, as shown in FIGS. 7A to 7C, when the expression levels of NNT and OSBPL3 proteins were analyzed in combination, the OW group patients with low expression of NNT protein and high expression of OSBPL3 had a 2.02 times higher event free survival risk rate compared to the other groups (95% CI: 1.05-3.90) and the p-value of the CPH model corrected with gender and age was 0.035, which was statistically significant. Meanwhile, as shown in FIGS. 8A to 8C, even in the event free survival analysis, it was confirmed that the OW group patients with low expression of NNT protein and high expression of OSBPL3 had a tendency to have a disadvantageous survival compared to other patient groups.

The above results indicate that it is possible to predict survival of colorectal cancer patients using NNT and/or OSBPL3 gene.

Experimental Example 3: Survival Prediction Combining TNM Stage and NNT Protein Expression Level Survival prediction was analyzed by combining the TNM stage (tumor, node, metastasis stage) and NNT protein expression level, which are accepted as the best performing biomarkers for predicting colorectal cancer patient survival.

Specifically, the OW group of the GMC colorectal cancer cohort was divided into 4 groups (group 1: patients with high NNT protein expression (hereinafter referred to as $NNT_{High}$) and TNM stage 1/2, group 2: patients with low NNT protein expression (hereinafter referred to as $NNT_{low}$) and TNM stage 1/2, group 3: patients with $NNT_{High}$ and TNM stage 3/4, and group 4: patients with $NNT_{Low}$ and TNM stage 3/4), and the event free survival analysis was performed. As a comparison, the OW colorectal cancer patients were grouped into the patients of TNM stage 1/2 and the patients of TNM stage 3/4 for the event free survival analysis.

In addition, survival analysis of gene candidates selected by TCGA COAD data analysis in the GMC colorectal cancer cohort according to their protein expression determined by IHC staining was tested using the log-rank test, a univariate analysis, and the CPH modeling, a multivariate analysis, for the event free survival and disease specific survival. The log-rank test and CPH modeling for survival analysis were performed using the survival package in R version 4.0. The hazard rate of each variable obtained from the CPH modeling was visualized using the forestmodel package and used under R version 4.0.

Figure 9A:
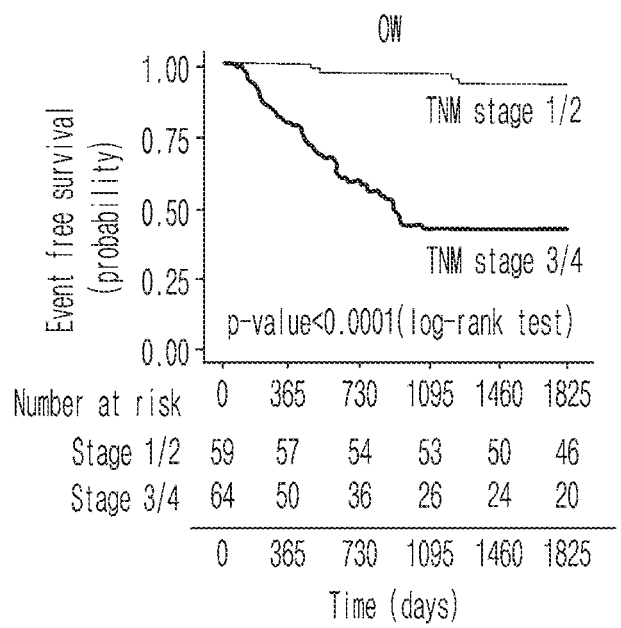
FIG. 9A is a graph showing the event free survival analysis based solely on TNM (tumor, node, metastasis stage) classification in the GMC colorectal cancer cohort.
Figure 9B:
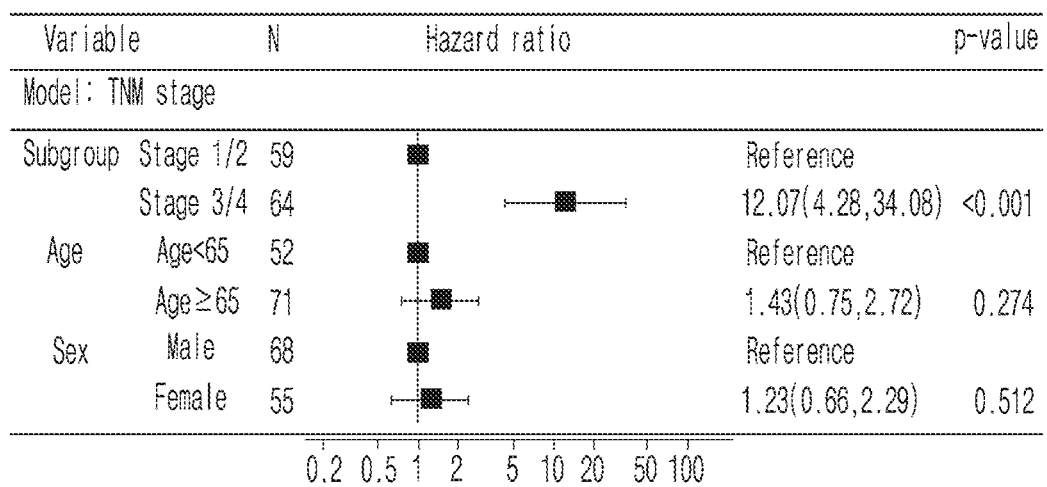
FIG. 9B is a diagram showing the hazard ratio analysis of FIG. 9A.
Figure 9C:
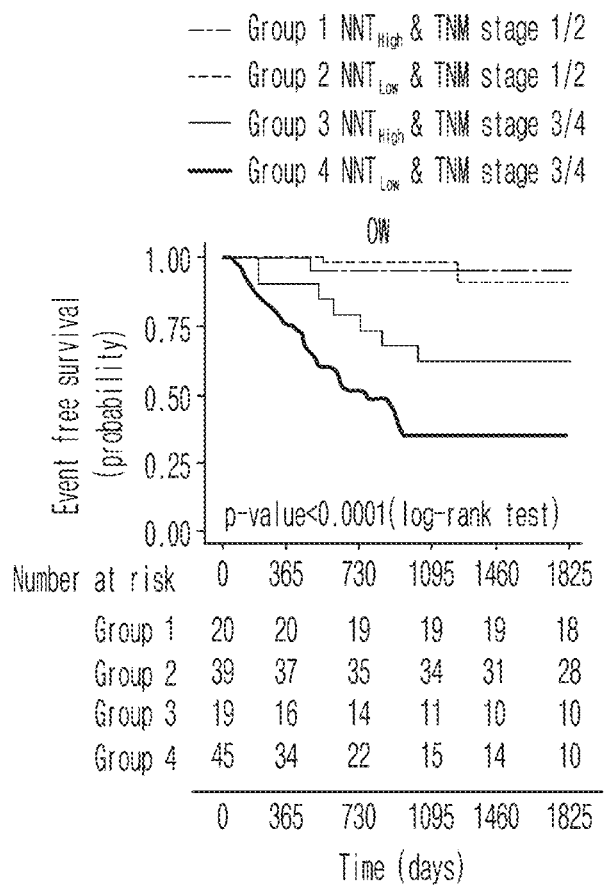
FIG. 9C is a graph showing the event free survival analysis by combining the NNT protein expression level and TNM stage in the GMC colorectal cancer cohort.
Figure 9D:
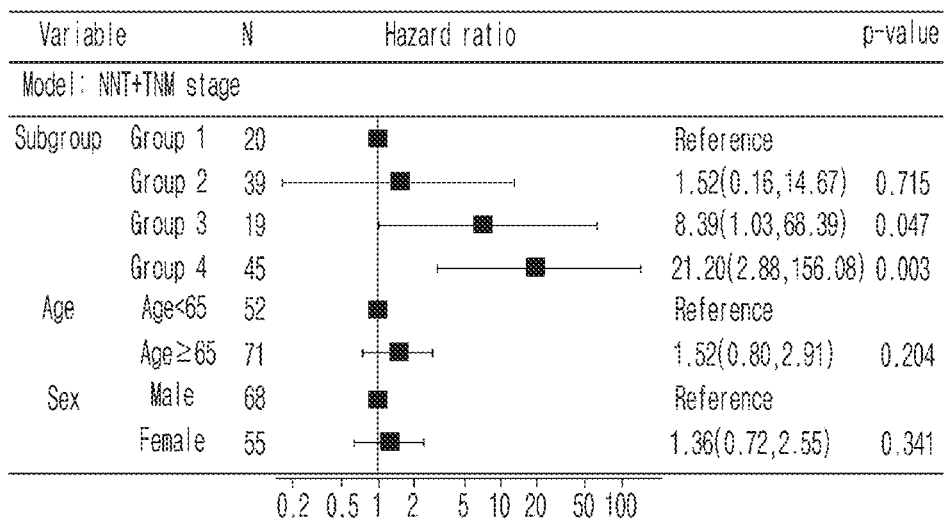
FIG. 9D is a diagram showing the hazard ratio analysis of FIG. 9C.
Figures 9E, 9F:
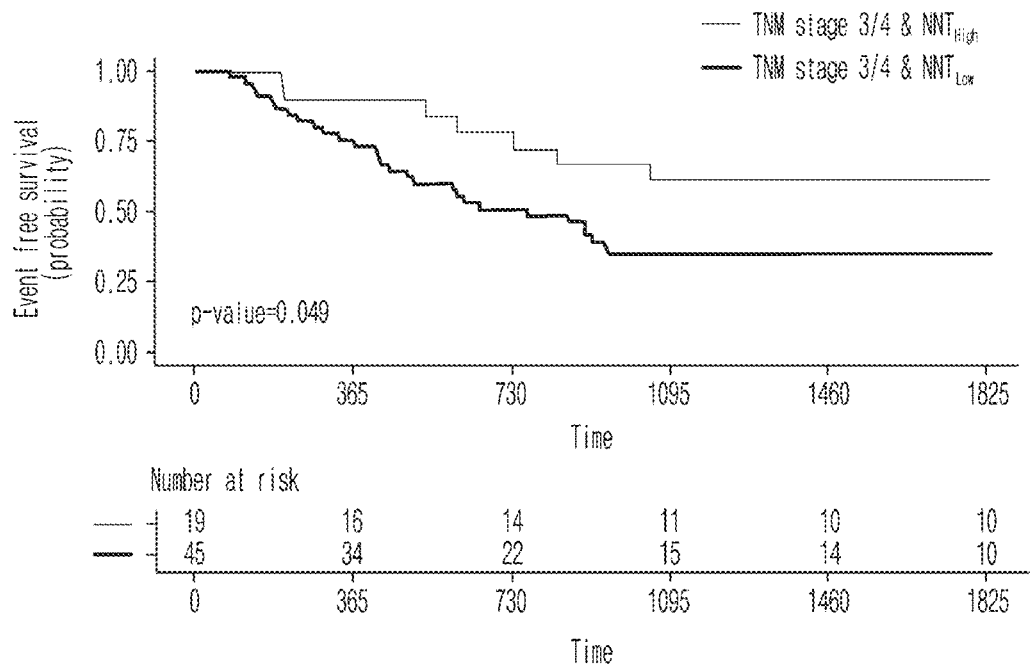
FIG. 9E is a graph showing the event free survival analysis according to the NNT protein expression level among patients with late TNM stages (stages 3 and 4) in the GMC colorectal cancer cohort.
FIG. 9F is a diagram showing the hazard ratio analysis of FIG. 9E.

As a result, as shown in FIGS. 9A to 9D, in the event free survival analysis using only the TNM stage, the event free survival risk rate of the patient group with TNM stage 3/4 was 12.07 times (95% CI: 4.28-34.08, log-rank test p-value<0.001) higher than that of the patient group with TNM stage 1/2. On the other hand, when the NNT and TNM stage were combined for analysis, the event free survival risk rate of the group 3 was 8.39 times (95% CI: 1.03-68.39, log-rank test p-value: 0.047) higher than that of the group 1, and the event free survival risk rate of the group 4 was 21.2 times (95% CI: 2.88-156.08, log-rank test p-value: 0.003) higher than that of the group 1. As shown in FIGS. 9E and 9F, in the patients with the same stage (TNM stage 3/4), the event free survival risk rate of the group with low NNT expression was 2.52 times higher than that of the group with high NNT expression, which was statistically significantly worse prognosis.

Figure 10A:
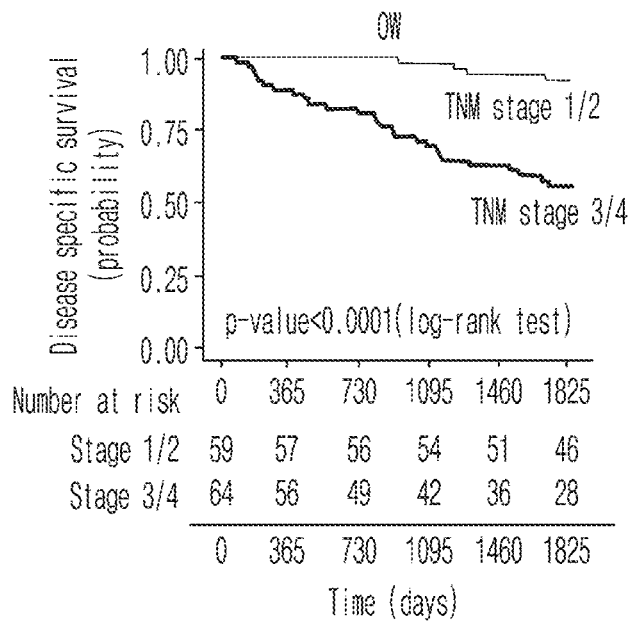
FIG. 10A is a graph showing the disease specific survival analysis based solely on TNM stage in the GMC colorectal cancer cohort.
Figure 10B:
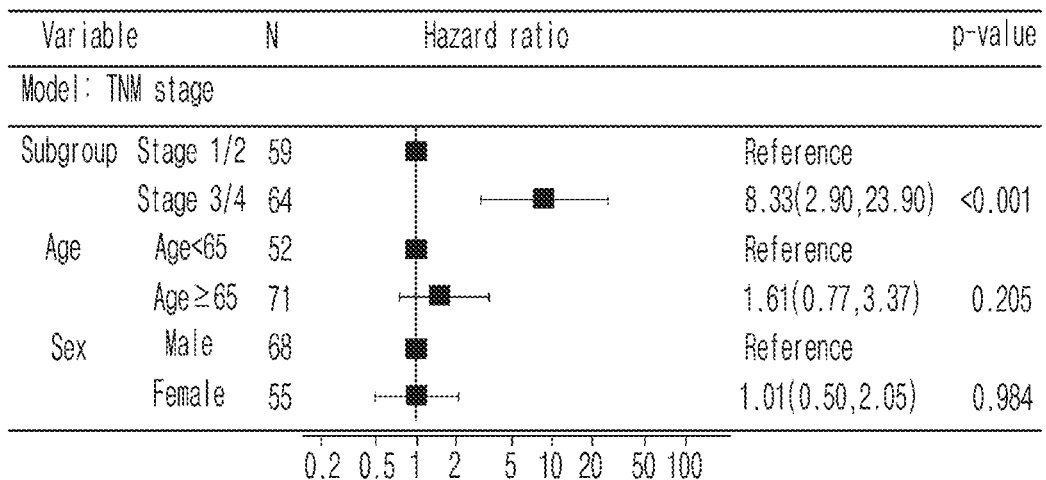
FIG. 10B is a diagram showing the hazard ratio analysis of FIG. 10A.
Figure 10C:
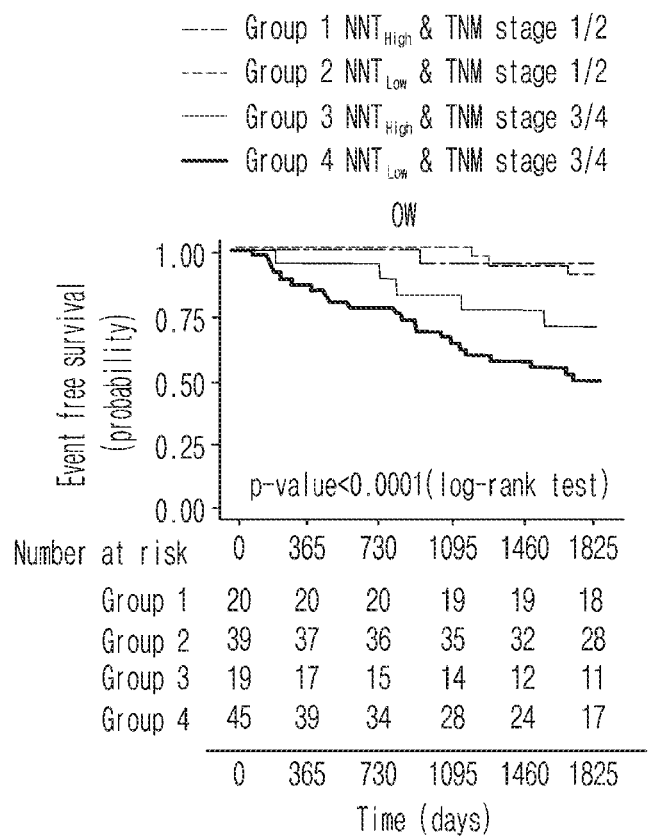
FIG. 10C is a graph showing the disease specific survival analysis by combining the NNT protein expression level and TNM stage in the GMC colorectal cancer cohort.
Figure 10D:
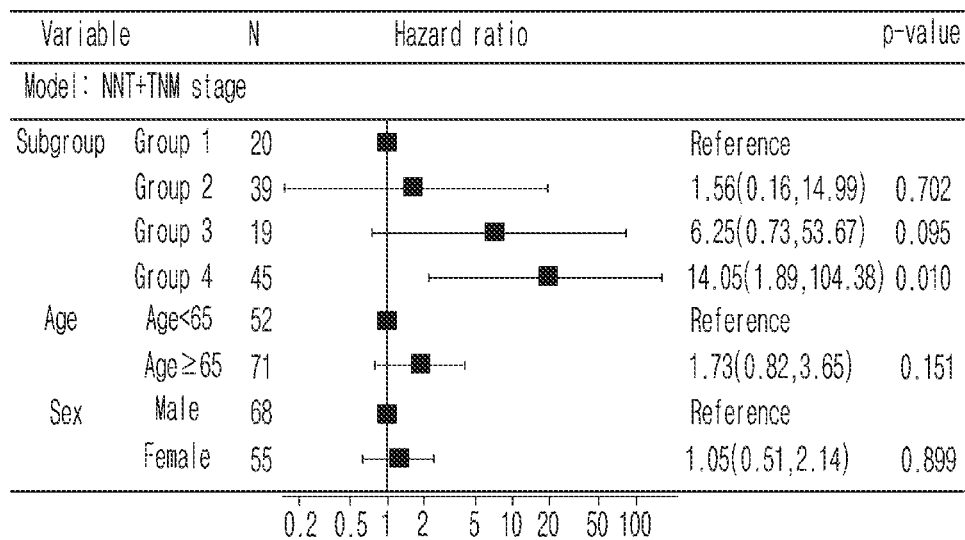
FIG. 10D is a diagram showing the hazard ratio analysis of FIG. 10B.
Figure 10E:
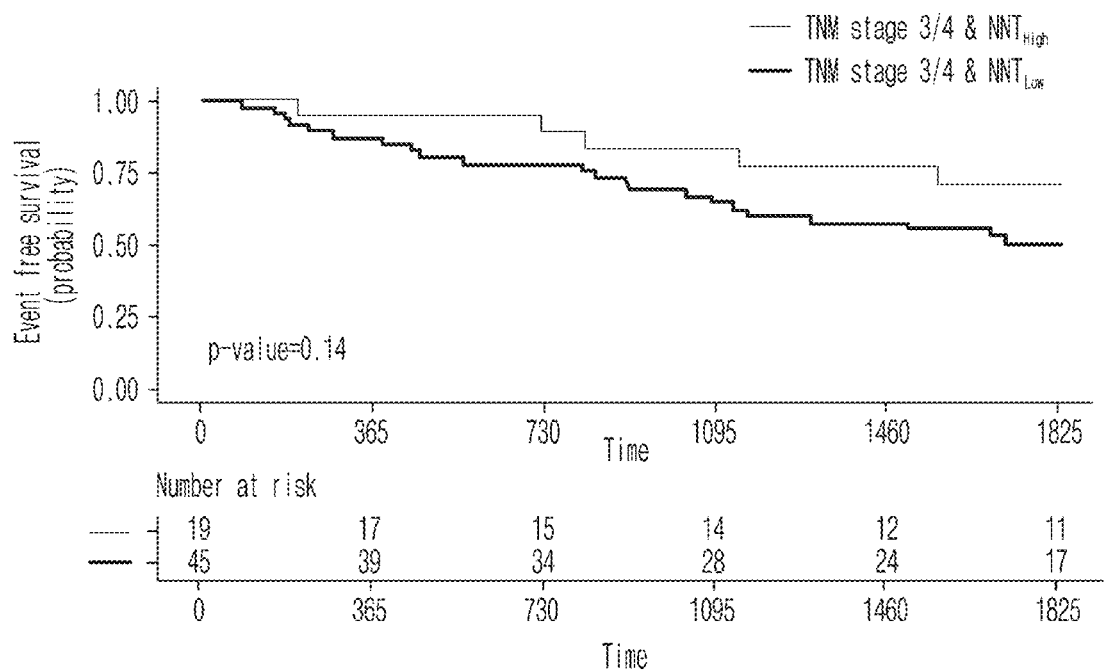
FIG. 10E is a graph showing the disease specific survival analysis according to the NNT protein expression level among patients with late TNM stages (stages 3 and 4) in the GMC colorectal cancer cohort.
Figure 10F:
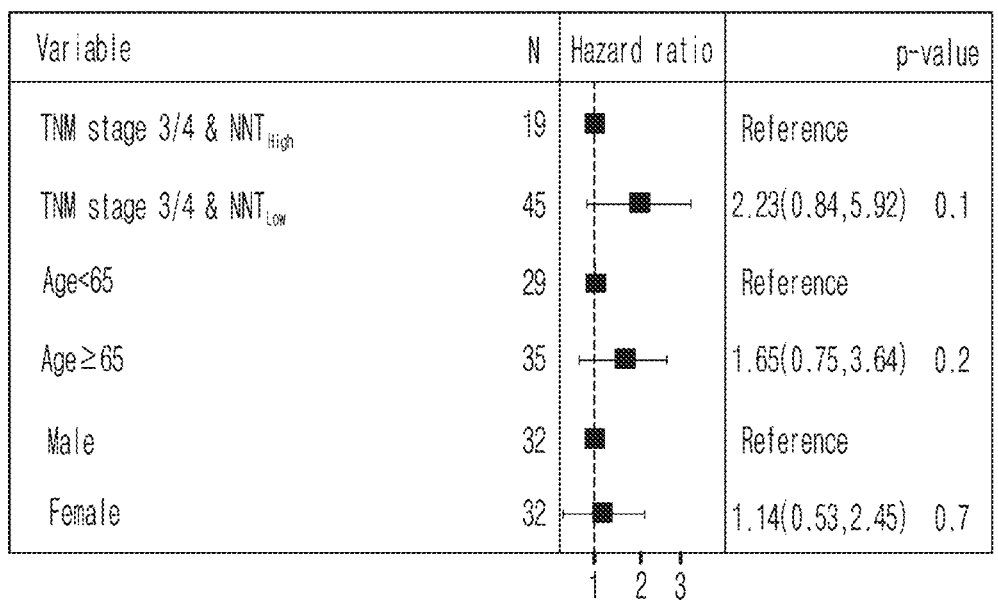
FIG. 10F is a diagram showing the hazard ratio analysis of FIG. 10E.

In addition, as shown in FIGS. 10A to 10D, in the disease specific survival analysis using only the TNM stage, the disease specific survival risk rate of the patient group with TNM stage 3/4 was 8.33 times (95% CI: 2.9-23.9, log-rank test p-value<0.001) higher than that of the patient group with TNM stage 1/2. On the other hand, when the NNT and TNM stage were combined for analysis, the disease specific survival risk rate of the group 3 was 6.25 times higher than that of the group 1, and the event free survival risk rate of the group 4 was 14.05 times (95% CI: 1.89-104.38, log-rank test p-value: 0.01) higher than that of the group 1. As shown in FIGS. 10E and 10F, in the patients with the same stage (TNM stage 3/4), the disease specific survival risk rate of the group with low NNT expression was 2.23 times higher than that of the group with high NNT expression, which was statistically significantly worse prognosis.

From the above results, it was confirmed that when the TNM stage and NNT expression were combined to predict survival, better survival prediction was possible than when the only TNM stage was used to predict survival. This suggests that better performance in survival prediction is possible when the NNT expression is combined with the TNM stage and used as a biomarker.

Experimental Example 4: Survival Prediction Combining TNM Stage and OSBPL3 Expression Level Survival prediction was analyzed by combining the TNM stage (tumor, node, metastasis stage) and OSBPL3 protein expression level.

Specifically, the OW group of the GMC colorectal cancer cohort was divided into 2 groups (group 1: patients with high OSBPL3 protein expression (hereinafter referred to as $OSBPL3_{High}$) and TNM stage 3/4, and group 2: patients with low OSBPL3 protein expression (hereinafter referred to as $OSBPL3_{Low}$) and TNM stage 3/4), and the event free survival analysis was performed.

Figure 11A:
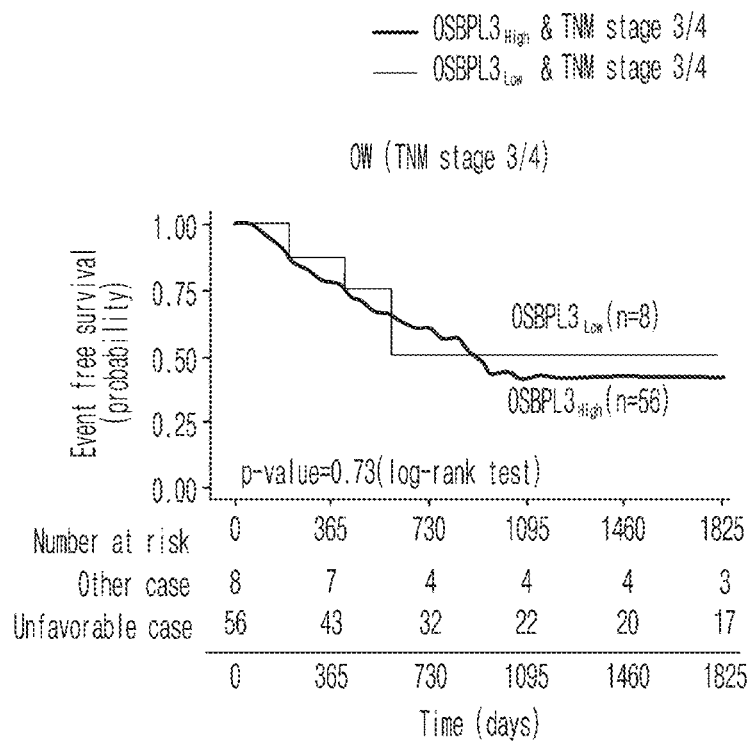
FIG. 11 is a set of graphs showing the disease specific survival analysis according to the OSBPL3 protein expression level in the OW (FIG. 11A), HW (FIG. 11B), and OW&HW groups (FIG. 11C) with late TNM stages (stages 3 and 4) in the GMC colorectal cancer cohort.
Figure 11B:
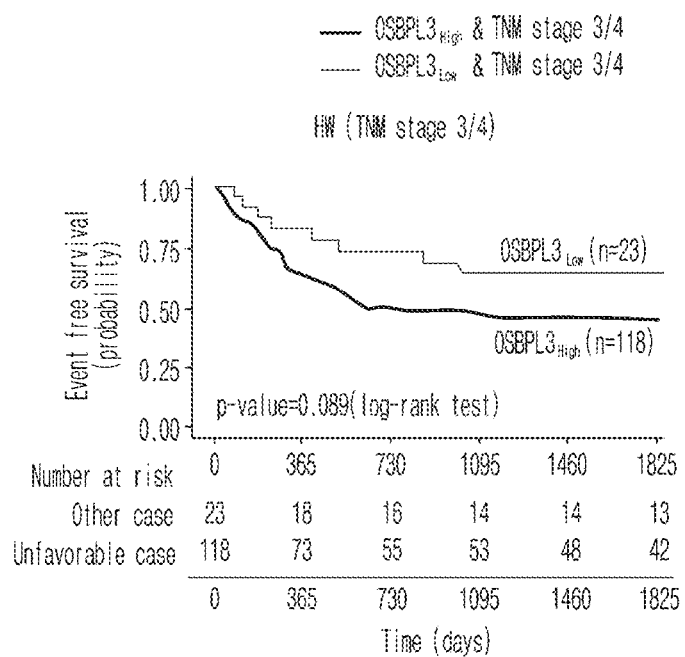
Figure 11C:
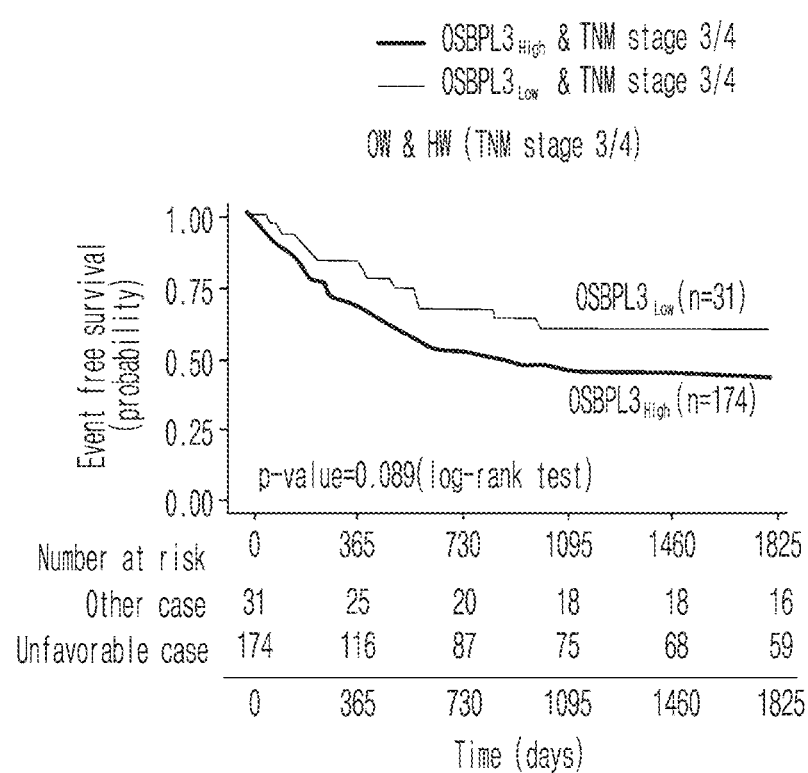

As a result, as shown in FIGS. 11A to 11C, when event-free survival was determined in patients with the same stage (TNM stage 3/4), it was confirmed that the group with low OSBPL3 expression tended to have a better chance of survival than the group with high OSBPL3T expression. This suggests that better performance in survival prediction is possible when the OSBPL3T expression is combined with the TNM stage and used as a biomarker.

Experimental Example 5: Analysis of Signaling Pathways, Protein Networks, and Biological Functions Network and biological function analyses were performed to identify the differences in biological functions of the NNT protein found to be significantly associated with survival prediction in the OW group within the GMC colorectal cancer cohort.

Specifically, to confirm the differences in biological functions of proteins specifically expressed in obese colorectal cancer patients, using the TCGA and COAD gene expression data sets, patients were divided into two groups: obese colorectal cancer patients with high expression of the corresponding gene and obese colorectal cancer patients with low expression of the corresponding gene, and compared with the expression of the gene in the normal tissues of normal weight colorectal cancer patients. Biological functions with high biological correlation to genes were searched in the Comparative Toxicogenomics Database (CTD). A network of highly related proteins was constructed using the String database, and the biological functions of the proteins in the network were confirmed using Reactome, a biological pathway database provided by the String database. The biological functions according to the differences in expression levels of genes encoding proteins specifically expressed in obese colorectal cancer patients were analyzed with the Gene Set Enrichment Analysis (GSEA), an analysis tool.

As a result, as shown in FIG. 12, the biological functions with high biological correlation with the NNT gene were confirmed as nicotinate and nicotinamide metabolism, pyruvate metabolism, citric acid (TCA) cycle, etc.

In addition, as shown in FIGS. 13A and 13B, the network of proteins closely related to the NNT protein and the biological functions associated with the proteins participating in this network were confirmed to be statistically significant in nicotinate and nicotinamide metabolism and TCA cycle.

In addition, from the TCGA colorectal cancer gene expression dataset, only the obese patient group and the normal group were extracted and analyzed with GSEA. As a result, as shown in FIG. 14, it was confirmed that there were statistically significant differences in signaling pathways between the obese colorectal cancer patient group with $NNT_{High}$ and the obese colorectal cancer patient group with $NNT_{Low}$. Specifically, the obese $NNT_{Low}$ group, which was confirmed as being disadvantageous for survival, showed statistically significant suppression of nicotinate and nicotinamide metabolism, inositol phosphate metabolism, and purine metabolism compared to the normal group. On the other hand, the obese $NNT_{High}$ group, which was confirmed to have an advantage in survival among the obese colorectal cancer patients, showed statistically significant suppression of glycosphingolipid biosynthesis—ganglio series compared to the normal group.

What is claimed is:

1. A method for predicting the survival prognosis of an obese colorectal cancer patient, wherein the obese colorectal cancer patient has a body mass index (BMI) of 25 or higher, comprising the following steps:
   (a) a step of measuring the protein level of nicotinamide nucleotide transhydrogenase (NNT) gene and OSBPL3 (oxysterol binding protein like 3) gene in a tissue sample isolated from an obese colorectal cancer patient, comprising:
   constructing a tissue microarray (TMA) from the tissue sample isolated from the obese colorectal cancer patient, and measuring the protein levels of the NNT gene and OSBPL3 gene by immunohistochemical (IHC) staining;
   (b) a step of comparing the measured mRNA or protein level with the protein level of a control sample; and
   (c) a step of determining the survival prognosis of the obese colorectal cancer patient, wherein the survival prognosis is determined to be good if the protein level of the NNT gene is higher than that of the control sample and the protein level of the OSBPL3 gene is lower than that of the control sample.

2. The method for predicting the prognosis of an obese colorectal cancer patient according to claim 1, wherein the sample of step (a) above is colon tissue.

3. A method for predicting the survival prognosis of an obese colorectal cancer patient, wherein the obese colorectal cancer patient has a body mass index BMI) of 25 or higher, comprising the following steps:
   (a) a step of measuring the protein level nicotinamide nucleotide transhydrogenase (NNT) gene and OSBPL3 (oxysterol binding protein like 3) gene in a tissue sample isolated from an obese colorectal cancer patient, comprising:
   constructing a tissue microarray (TMA) from the tissue sample isolated from the obese colorectal cancer patient, and
   measuring the protein levels of the NNT gene and OSBPL3 gene by immunohistochemical (IHC) staining;
   (b) a step of comparing the measured protein level with the protein level of a control sample;
   (c) a step of combining and analyzing the information classified according to the TNM stage (tumor, node, metastasis stage); and
   (d) a step of determining the survival prognosis of the obese colorectal cancer patient, wherein the survival prognosis is determined to be good if the NNT level is higher than that of a control group in the same TNM stage and the OSBPL3 level is lower than that of the control group in the same TNM stage.

* * * * *